(12) United States Patent
Tanabe et al.

(10) Patent No.: US 7,576,928 B2
(45) Date of Patent: Aug. 18, 2009

(54) SOLID IMMERSION LENS HOLDER

(75) Inventors: Hiroshi Tanabe, Hamamatsu (JP); Ikuo Arata, Hamamatsu (JP); Hirotoshi Terada, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 496 days.

(21) Appl. No.: 10/878,527

(22) Filed: Jun. 29, 2004

(65) Prior Publication Data

US 2005/0094293 A1 May 5, 2005

(30) Foreign Application Priority Data

Oct. 31, 2003 (JP) .......................... P2003-372845

(51) Int. Cl.
*G02B 7/02* (2006.01)

(52) U.S. Cl. ....................... 359/819; 359/811; 359/813; 359/822

(58) Field of Classification Search ................. 359/819, 359/808, 813, 814; 369/44.14, 269, 273
See application file for complete search history.

(56) References Cited

U.S. PATENT DOCUMENTS

| 5,004,307 A | 4/1991 | Kino et al. .................... 350/1.2 |
| 5,125,750 A | 6/1992 | Corle et al. .................. 359/819 |
| 5,208,648 A | 5/1993 | Batchelder et al. .......... 356/237 |
| 5,220,403 A | 6/1993 | Batchelder et al. .......... 356/345 |
| 5,729,393 A * | 3/1998 | Lee et al. ..................... 359/819 |

(Continued)

FOREIGN PATENT DOCUMENTS

EP 0 977 192 A1 2/2000

(Continued)

OTHER PUBLICATIONS

Arata, I. et al., "Photoemission and OBIRCH Analysis with Solid Immersion Lens (SIL)", Conference Proceedings from the 29th International Symposium for Testing and Failure Analysis, ISTFA, Nov. 2-6, 2003, vol. 75, No. 4, Apr. 2004, pp. 325-329.

(Continued)

*Primary Examiner*—Scott J Sugarman
*Assistant Examiner*—Brandi N Thomas
(74) *Attorney, Agent, or Firm*—Drinker Biddle & Reath LLP

(57) ABSTRACT

An arrangement, equipped with a holder 9, which supports a solid immersion lens 3 in the gravity direction with the bottom surface of solid immersion lens 3 being protruded downward through an opening 9b, is provided. With this arrangement, when solid immersion lens 3 is set on an observed object, solid immersion lens 3 is put in a state in which it is raised by the observed object and is made free with respect to holder 9. Also in this state, an excessive pressure will not be applied to the observed object and yet solid immersion lens 3 is put in close contact in conformance with the observed object and temperature drifts at the holder 9 side or the observed object side are cut off from the counterpart side and thus the influences of such temperature drifts are eliminated. A solid immersion lens holder, with which the damaging of the observed object can be eliminated and which enables high-precision observation, is thus provided.

12 Claims, 24 Drawing Sheets

U.S. PATENT DOCUMENTS

| | | | |
|---|---|---|---|
| 5,939,709 A | 8/1999 | Ghislain et al. | 250/216 |
| 6,270,696 B1 * | 8/2001 | Jain et al. | 264/1.1 |
| 6,441,359 B1 | 8/2002 | Cozier et al. | 250/216 |
| 6,475,398 B2 | 11/2002 | Kitahata | 216/2 |
| 6,594,086 B1 | 7/2003 | Pakdaman et al. | 359/656 |
| 6,594,204 B1 * | 7/2003 | Yamamoto et al. | 369/44.14 |
| 6,608,359 B2 | 8/2003 | Kitahata | 257/432 |
| 6,621,275 B2 | 9/2003 | Cotton et al. | 324/537 |
| 6,656,029 B2 | 12/2003 | Kitahata | 451/384 |
| 6,687,058 B1 | 2/2004 | Ippolito et al. | 359/656 |
| 6,845,066 B1 * | 1/2005 | Shingo | 369/44.23 |
| 2003/0184885 A1 * | 10/2003 | Tansho et al. | 359/819 |
| 2003/0202255 A1 | 10/2003 | Pakdaman et al. | 359/656 |
| 2003/0210057 A1 | 11/2003 | Cotton et al. | 324/501 |

FOREIGN PATENT DOCUMENTS

| | | | |
|---|---|---|---|
| JP | 59-149310 | | 8/1984 |
| JP | 59149310 | * | 8/1984 |
| JP | 05-157701 | | 6/1993 |
| JP | 07-018806 | | 6/1993 |
| JP | 06-300824 | | 10/1994 |
| JP | 07-190946 | | 7/1995 |
| JP | 11-003534 | | 1/1999 |
| JP | 11259887 A | * | 9/1999 |
| JP | 1 041 545 A1 | * | 10/1999 |
| JP | 11-305135 | | 11/1999 |
| JP | 2000-171611 A | | 6/2000 |
| JP | 2001-023230 | | 1/2001 |
| JP | 2001023191 A | * | 1/2001 |
| JP | 2001-34998 A | | 2/2001 |
| JP | 2001-189359 | | 7/2001 |
| JP | 2002-189000 | | 7/2002 |
| JP | 2002-236087 A | | 8/2002 |
| JP | 2003-260581 A | | 9/2003 |

OTHER PUBLICATIONS

Arata, I. et al., "Photoemission and OBIRCH Analysis with Sold Immersion Lens (SIL)", ISTFA 2003, Mar. 10, 2003, pp. 1-20.

* cited by examiner

SOLID IMMERSION LENS HOLDER

BACKGROUND OF THE INVENTION

1. Field of the Invention

This invention concerns a holder for a solid immersion lens.

2. Related Background of the Invention

A solid immersion lens (SIL) is known as a lens for magnifying an image of an observed object. This solid immersion lens has a hemispherical shape or a hyperhemispherical shape, called a Weierstrass sphere, and is a microlens with a size of approximately 1 mm to 5 mm. When this solid immersion lens is put in close contact with a surface of an observed object, since both the numerical aperture NA and the magnification are increased, observation at high spatial resolution is enabled.

A device, for which the observed object is a semiconductor wafer and with which a solid immersion lens is put in close contact with a rear surface of the semiconductor wafer to inspect the fine characteristics of the interior of the semiconductor wafer through a microscope, has thus been proposed (see for example, Document 1: Japanese Patent Publication No. H7-18806). A device, for which the observed object is an optical recording medium and with which a solid immersion lens is put in close contact with a rear surface of a transparent substrate of the optical recording medium by being pushed against the rear surface by means of a spring to observe pits, record marks, etc., on the optical recording medium through a microscope, has also been proposed (see for example, Document 2: Japanese Patent Application Laid-Open No. H11-305135).

SUMMARY OF THE INVENTION

Here, though a method of holding a solid immersion lens is not described specifically with the former art, with general methods, for example, a method wherein a solid immersion lens is fixed on a holder by means of an adhesive, etc., or a method wherein a solid immersion lens is held urgingly by a spring as in the latter art, there are the following problems.

That is, there are cases where an observed object with which a solid immersion lens is put in close contact becomes cracked or damaged otherwise due to an excessive pressure being applied to the observed object. In a rear surface analysis of a semiconductor device, the strength during handling must be considered adequately in applying pressure to a semiconductor substrate so that an integrated circuit formed on the semiconductor substrate surface will not become damaged.

Also, since a solid immersion lens is pressed against an observed object, depending on the flatness of the object, observation of high precision is made difficult due to gaps that form between the solid immersion lens and the observed object. With a rear surface analysis of a semiconductor device using a solid immersion lens, when a gap forms between the solid immersion lens and the semiconductor substrate, since incident light of the critical angle or higher becomes totally reflected so that only incident light of no more than the critical angle will propagate, the effective numerical aperture is restricted by the critical angle. However, when the gap between the solid immersion lens and the semiconductor substrate rear surface becomes approximately equivalent to the wavelength of light inside the semiconductor, light is enabled to propagate due to evanescent coupling.

However, if a part at which the gap is large exists in a region in which the bottom surface of the solid immersion lens opposes the rear surface of the semiconductor substrate, the transmitted light intensity drops drastically, only incident light of no more than the critical angle can propagate, and the effective numerical aperture is restricted at this part at which the gap is large. It thus becomes difficult for the inherent resolution of the solid immersion lens to be exhibited.

High precision observation is also made difficult by the peeling off (separation) of a solid immersion lens from an observed object due to a temperature drift at the solid immersion lens holder side or the observed object side.

This invention has been made in view of such issues, and an object thereof is to provide a solid immersion lens holder that enables high precision observation without damaging of an observed object.

A solid immersion lens holder by this invention is characterized in equipping a holder that supports a solid immersion lens in the gravity direction with a bottom surface of the solid immersion lens protruding downward through an opening.

With such a solid immersion lens holder, when the solid immersion lens that is supported in the gravity direction by the holder is set on an observed object, the solid immersion lens is put in a state (free state) in which it is raised by the observed object and is free with respect to the holder. An excessive force will thus not be applied to the observed object and yet the solid immersion lens is put in close contact in conformance (compliance) to the observed object. Also, since a temperature drift at the holder side or the observed object side is cut off with respect to the counterpart side, the influences of temperature drifts are eliminated.

Here, as a specific arrangement by which the above actions are exhibited, an arrangement can be cited wherein the holder is equipped with a first holder, which is formed to have a cylindrical shape, holds the solid immersion lens in a state wherein the bottom surface of the solid immersion lens is protruded downward through an opening at the bottom surface thereof, and is equipped with a collar part at an outer peripheral surface thereof, and a second holder, which is formed to have a cylindrical shape, has the collar part of the first holder set thereon in a state wherein the bottom surface of the solid immersion lens, held by the first holder, is protruded downward through an opening at the bottom surface thereof, and supports the first holder and solid immersion lens in the gravity direction.

With such a solid immersion lens holder, the solid immersion lens can be held by the first holder without having to perform special processing on the solid immersion lens, and since the self-weights of the first holder and the solid immersion lens act on the observed object, an excessive pressure will not be applied to the observed object.

Also, as another specific arrangement that effectively exhibits the above-described actions, an arrangement can be cited wherein the solid immersion lens is arranged so that a central part of a bottom surface thereof protrudes with respect to a peripheral edge part thereof and the holder is formed to have a cylindrical shape, has the peripheral edge part of the solid immersion lens set thereon in a state wherein the central part of the solid immersion lens is protruded downward through an opening at the bottom surface thereof, and supports the solid immersion lens in the gravity direction.

With such a solid immersion lens holder, only the self-weight of the solid immersion lens acts on the observed object and the application of an excessive pressure to the observed object is prevented further.

The holder that supports the solid immersion lens is preferably equipped with a cylindrical cap, which is fitted onto an opening at an upper part of the holder and is for preventing the falling-off of the solid immersion lens. In this case, the falling-off of the solid immersion lens through the upper opening of the abovementioned holder is prevented by the above-described cap.

Also preferably, an arm part, which extends outward from the holder that supports the solid immersion lens, is equipped and this arm part is connected to a three-dimensional direction moving device. In this case, the solid immersion lens is freely moved to a desired position in three-dimensional directions by using the moving device.

The arm part may also be detachably connected to the three-dimensional direction moving device. In this case, for lens exchange, exchange of the arm part as a whole is enabled and the lens exchange is facilitated due to not having to handle the minute solid immersion lens.

DESCRIPTION OF THE PREFERRED EMBODIMENTS

Figure 1:
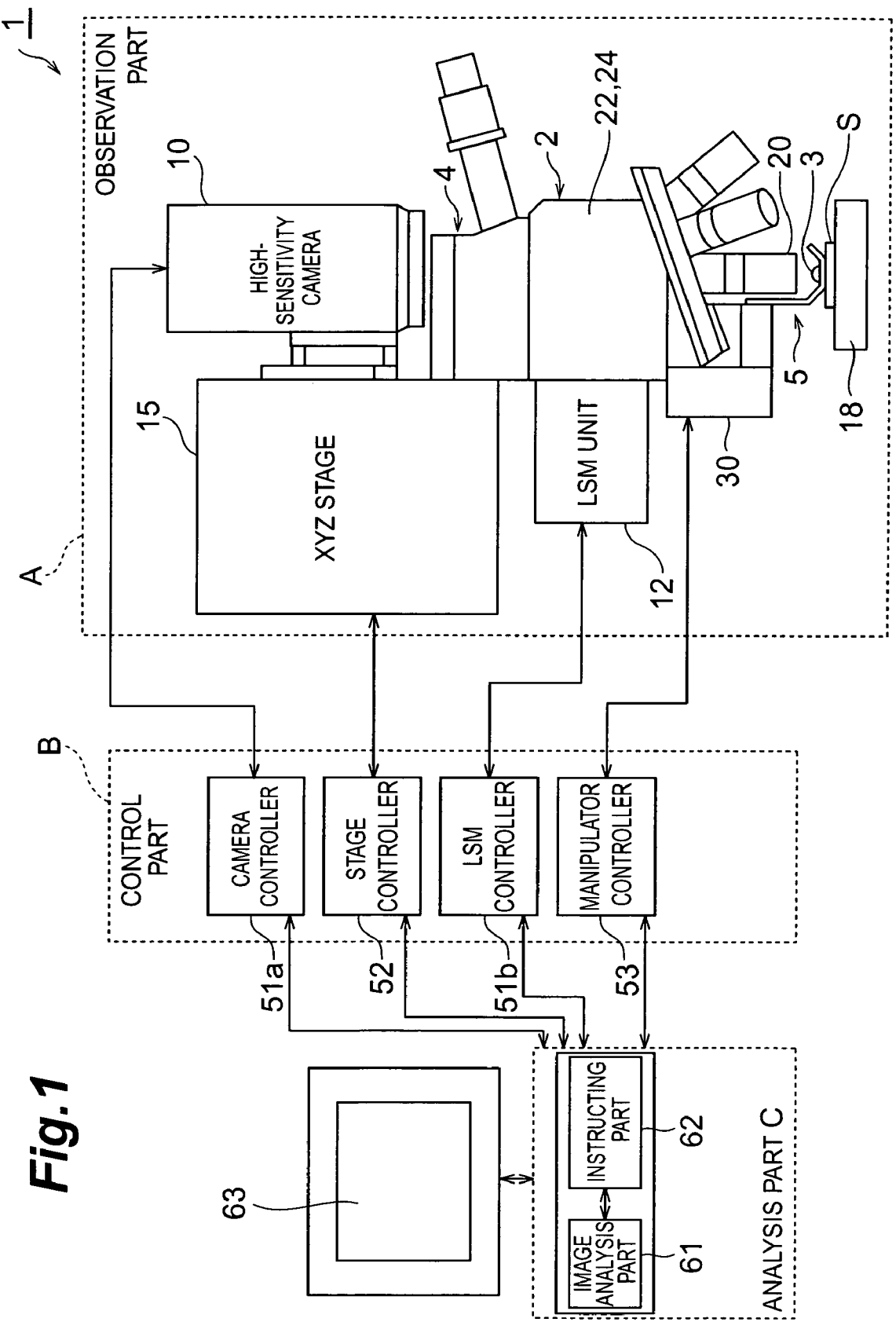
FIG. 1 is a block diagram showing a semiconductor inspection device equipped with a solid immersion lens holder of a first embodiment of this invention.
Figure 2:
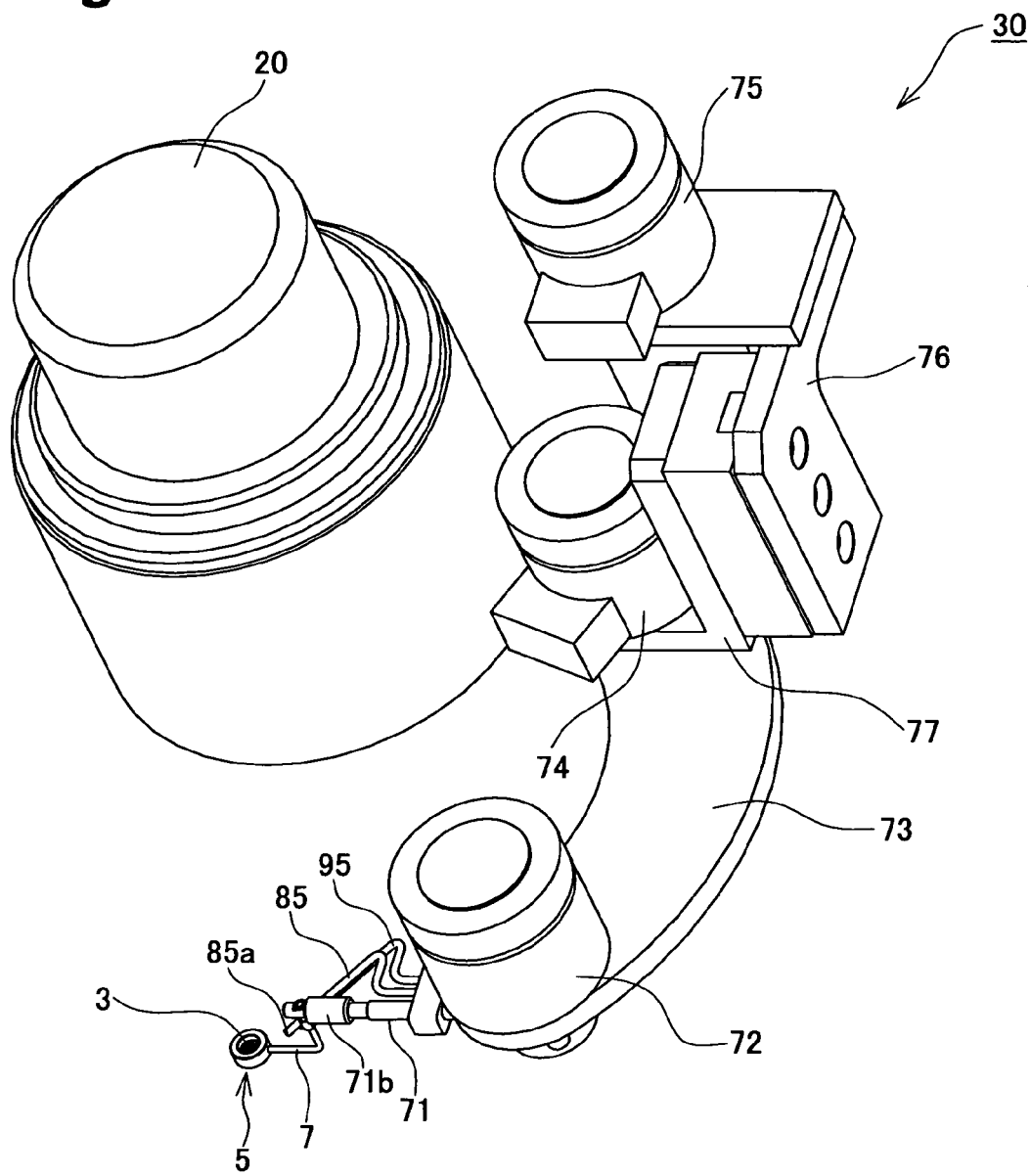
FIG. 2 is a perspective view of a solid immersion lens moving device and an objective lens as viewed from above.
Figure 3:
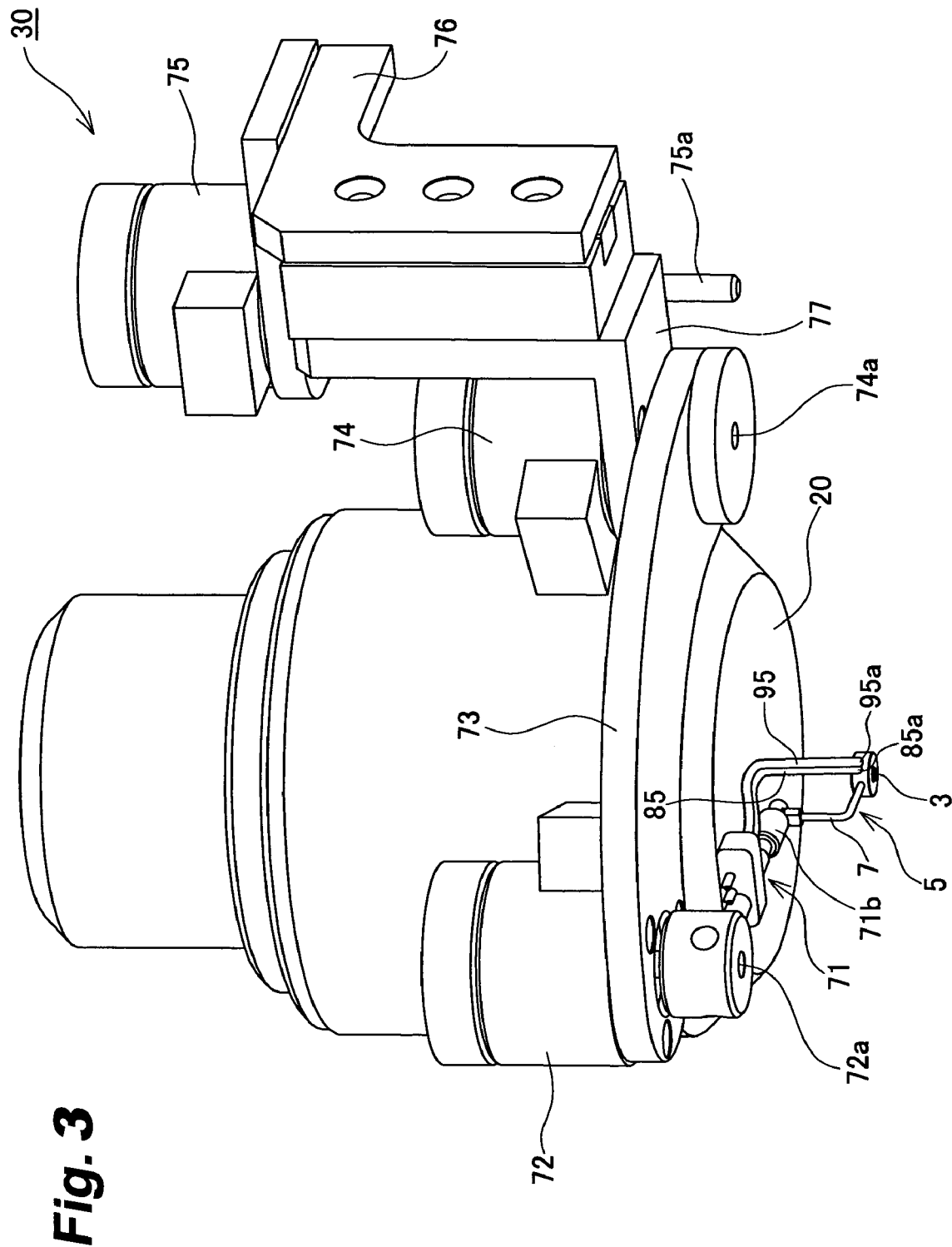
FIG. 3 is a perspective view of the solid immersion lens moving device and the objective lens as viewed from below.
Figure 4:
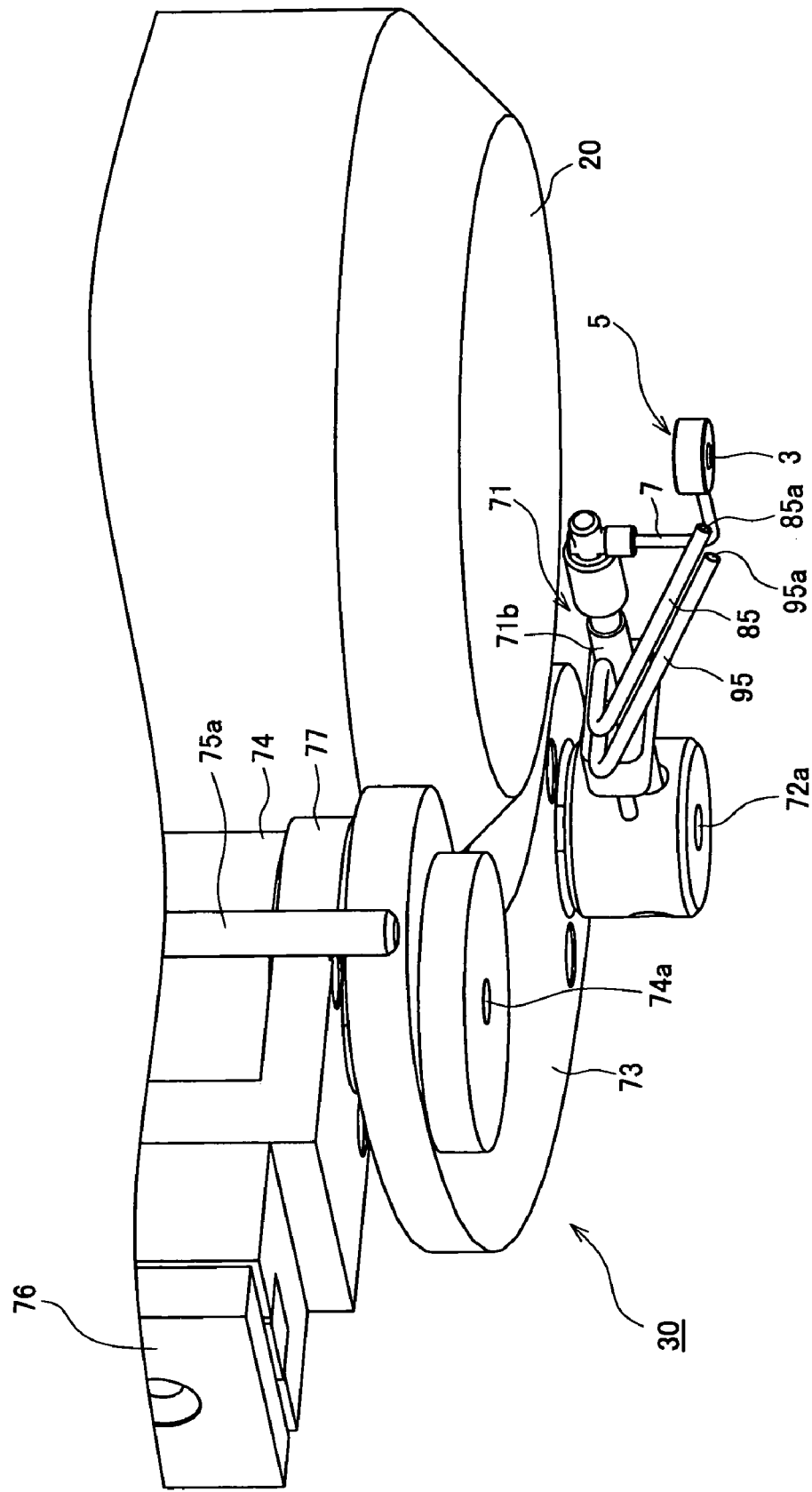
FIG. 4 is a perspective view of a lower part of the solid immersion lens moving device and the objective lens as viewed from below from a different viewpoint from that of FIG. 3.
Figure 5:
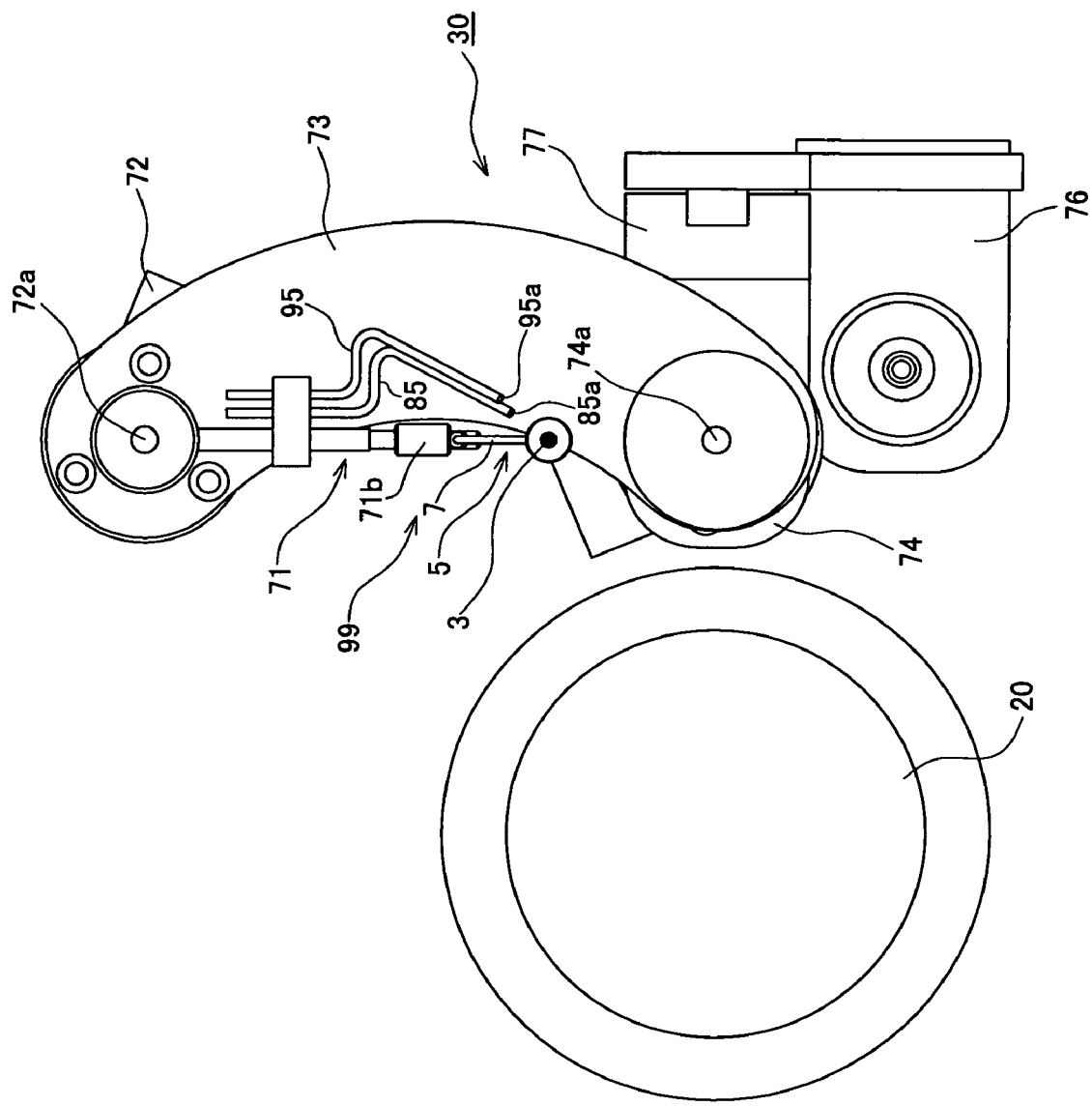
FIG. 5 is a bottom view of the solid immersion lens moving device and the objective lens in the state wherein a solid immersion lens is positioned at a standby position.
Figure 6:
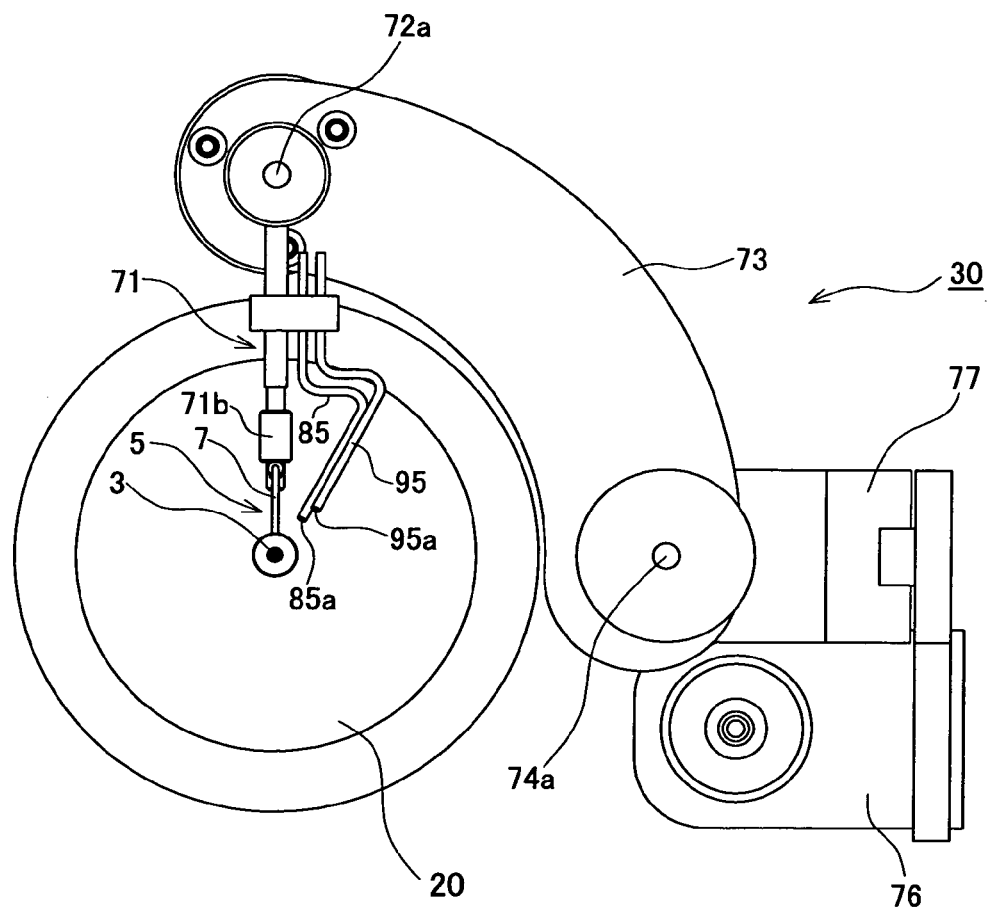
FIG. 6 is a bottom view of the solid immersion lens moving device and the objective lens in the state wherein the solid immersion lens is positioned at an inserted position or a closely contacting position.
Figure 7:
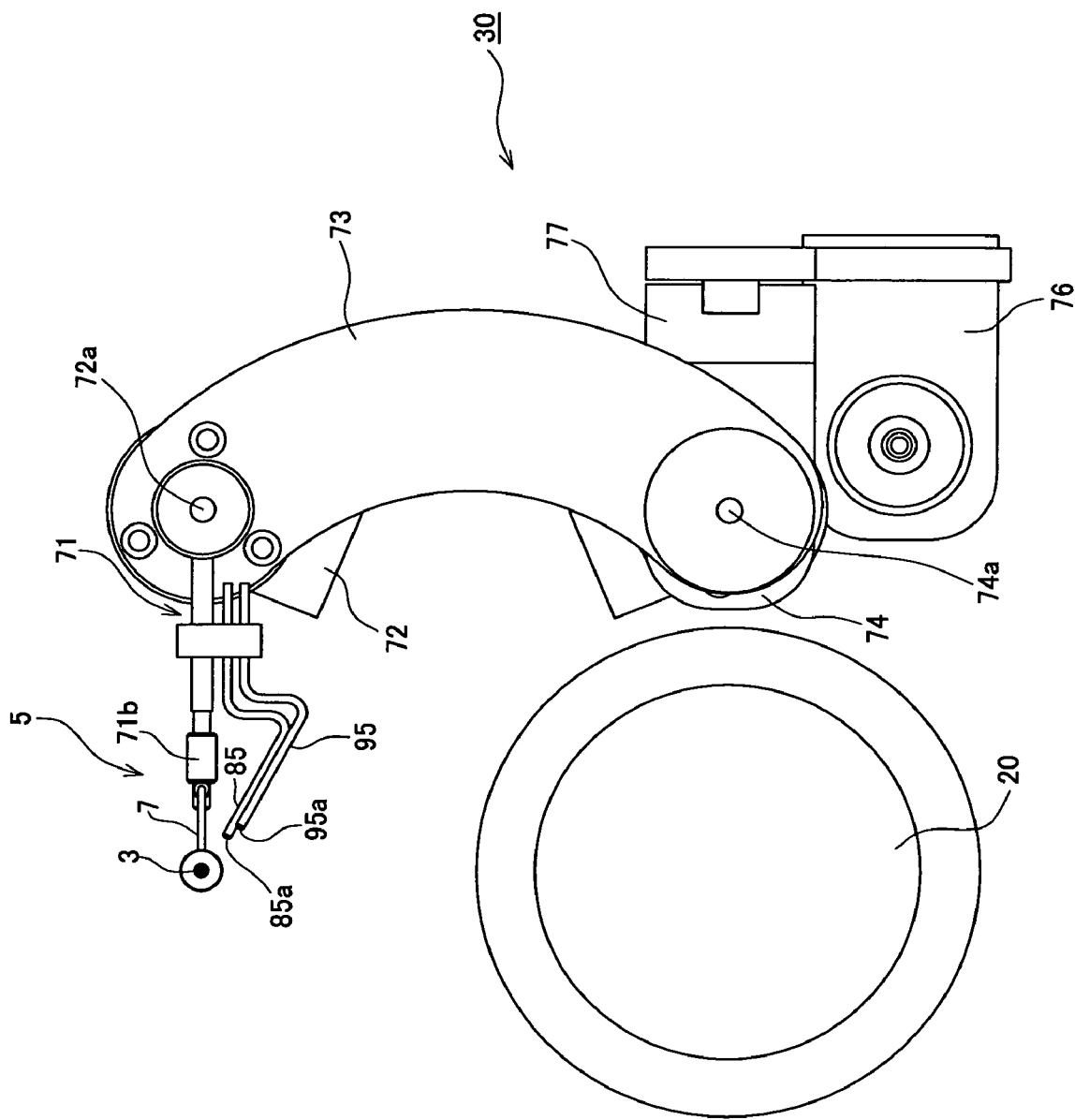
FIG. 7 is a bottom view of the solid immersion lens moving device and the objective lens in the state wherein the solid immersion lens is positioned at an exchange position.
Figure 8:
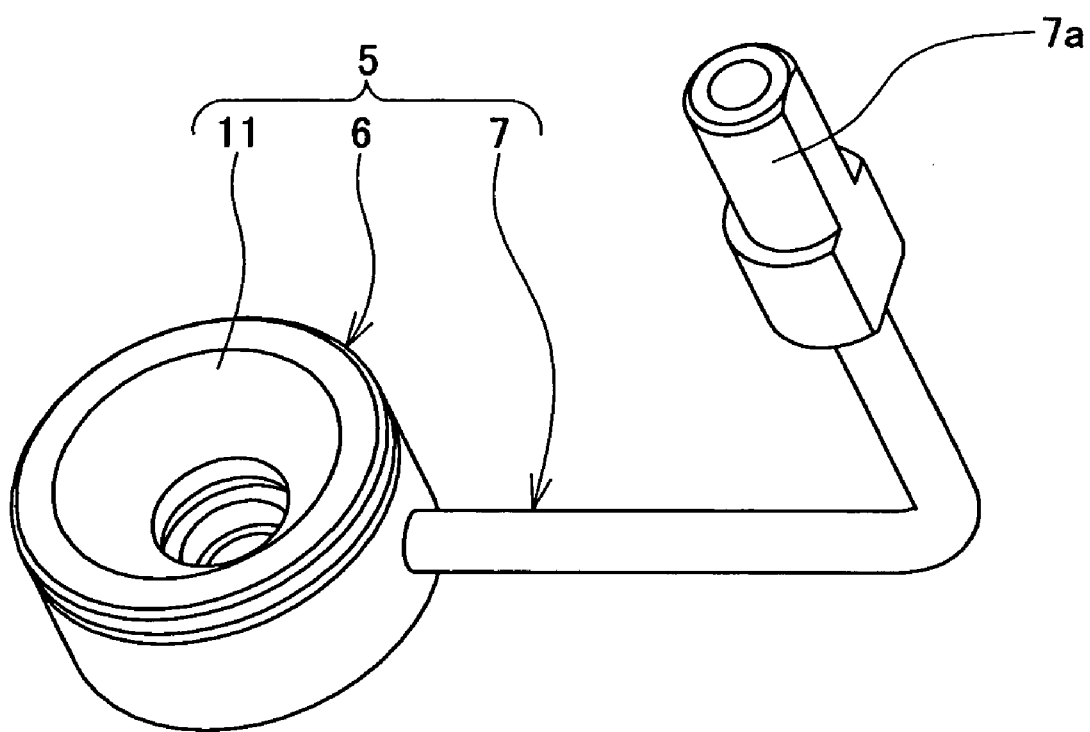
FIG. 8 is a perspective view showing the solid immersion lens holder.
Figure 9:
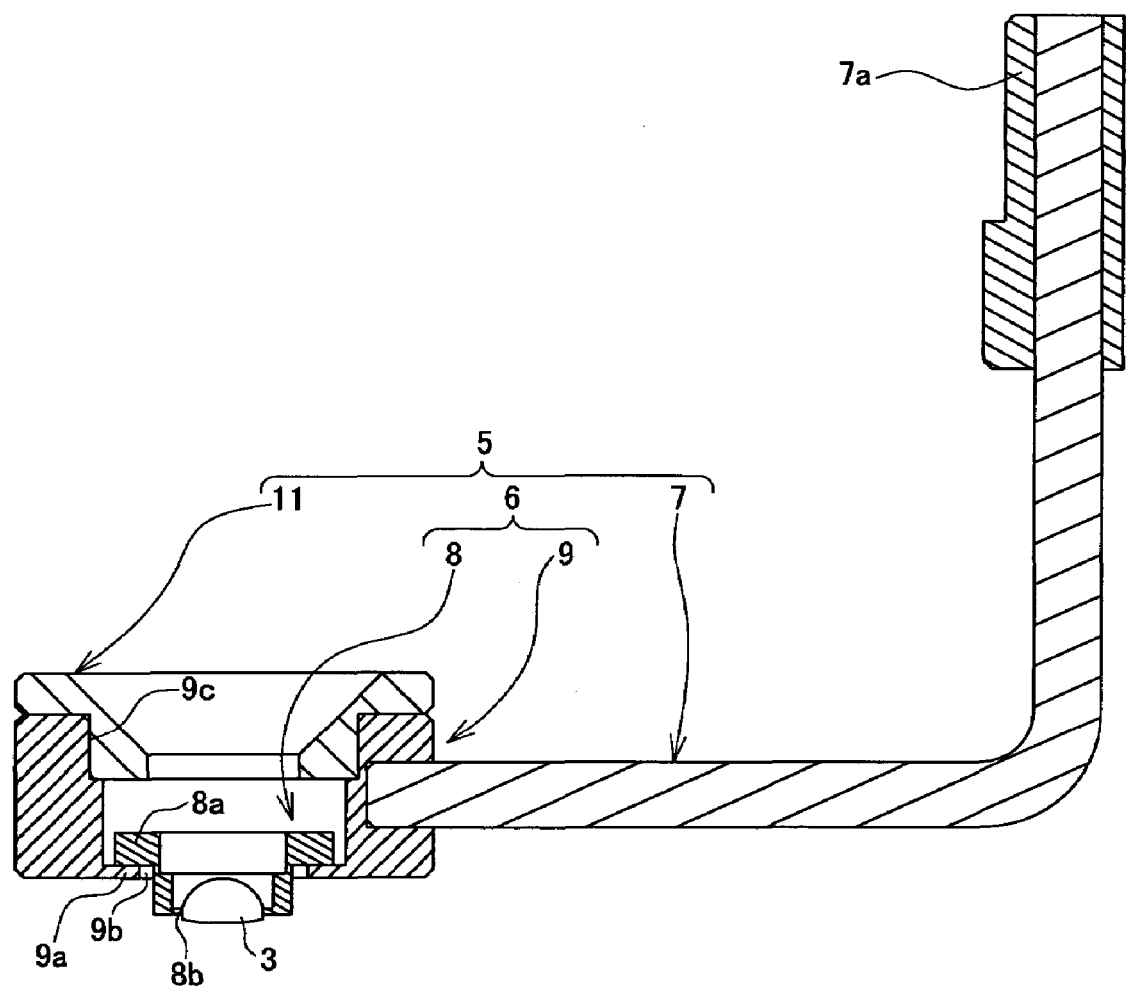
FIG. 9 is a vertical section showing the solid immersion lens holder in the state in which the lens is set at the standby position.
Figure 10:
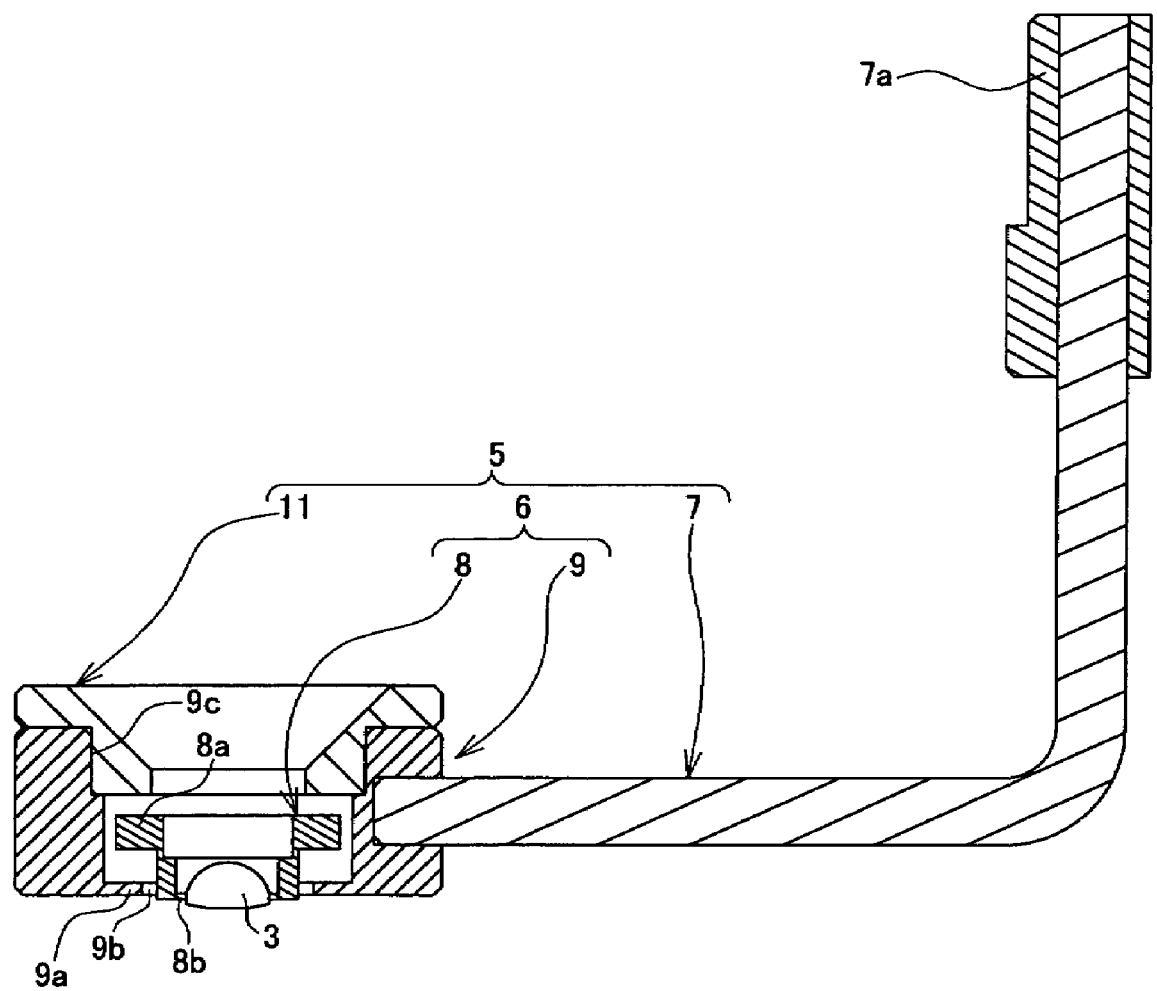
FIG. 10 is a vertical section showing the solid immersion lens holder in the state in which the lens is set at the closely contacting position.
Figure 11:
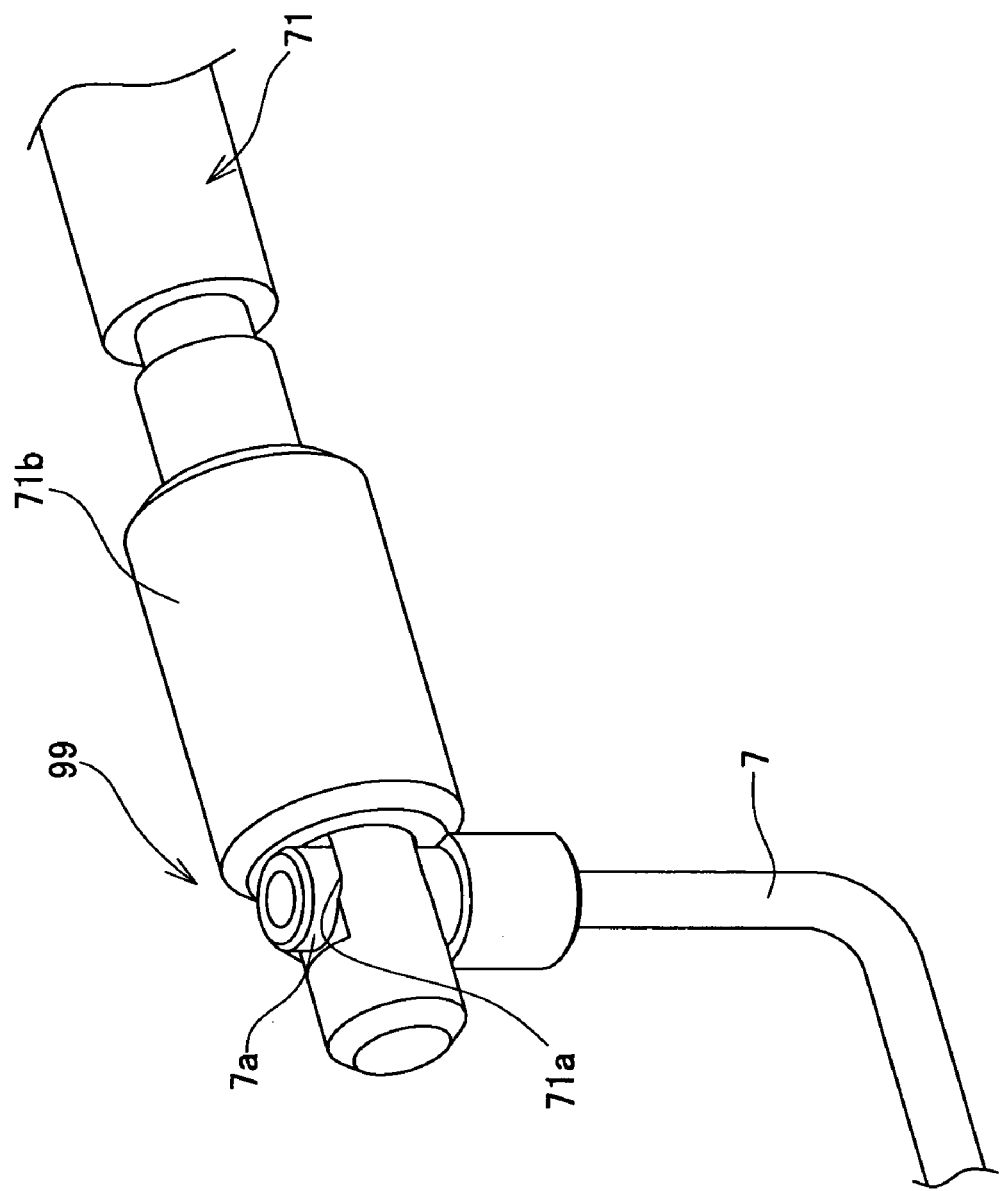
FIG. 11 is a perspective view showing a part at which an arm part of the solid immersion lens holder and a first arm member of the solid immersion lens moving device are connected.
Figure 12:
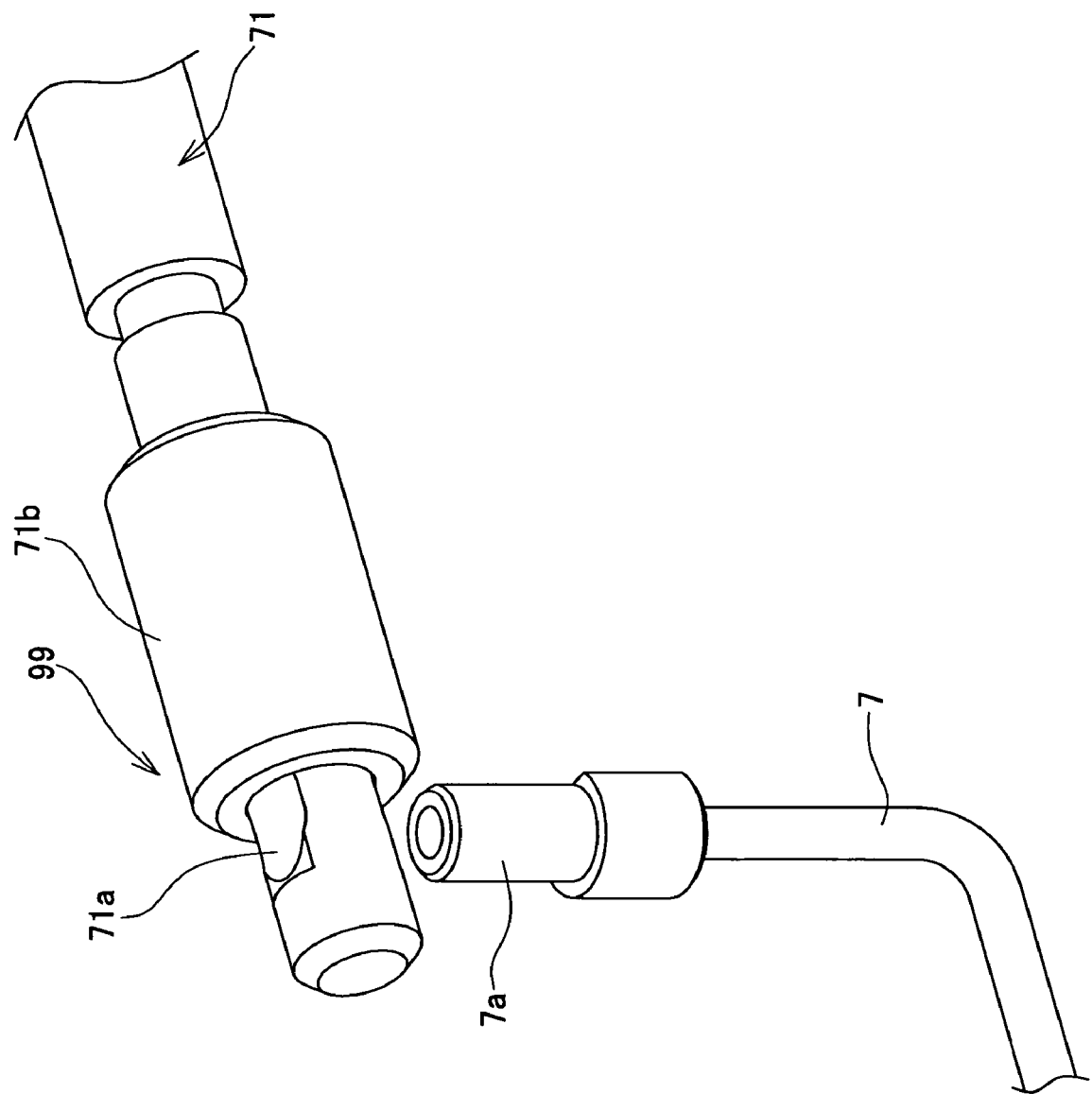
FIG. 12 is a perspective view showing the state prior to connection of the arm part of the solid immersion lens holder and the first arm member of the solid immersion lens moving device as viewed from the front.
Figure 13:
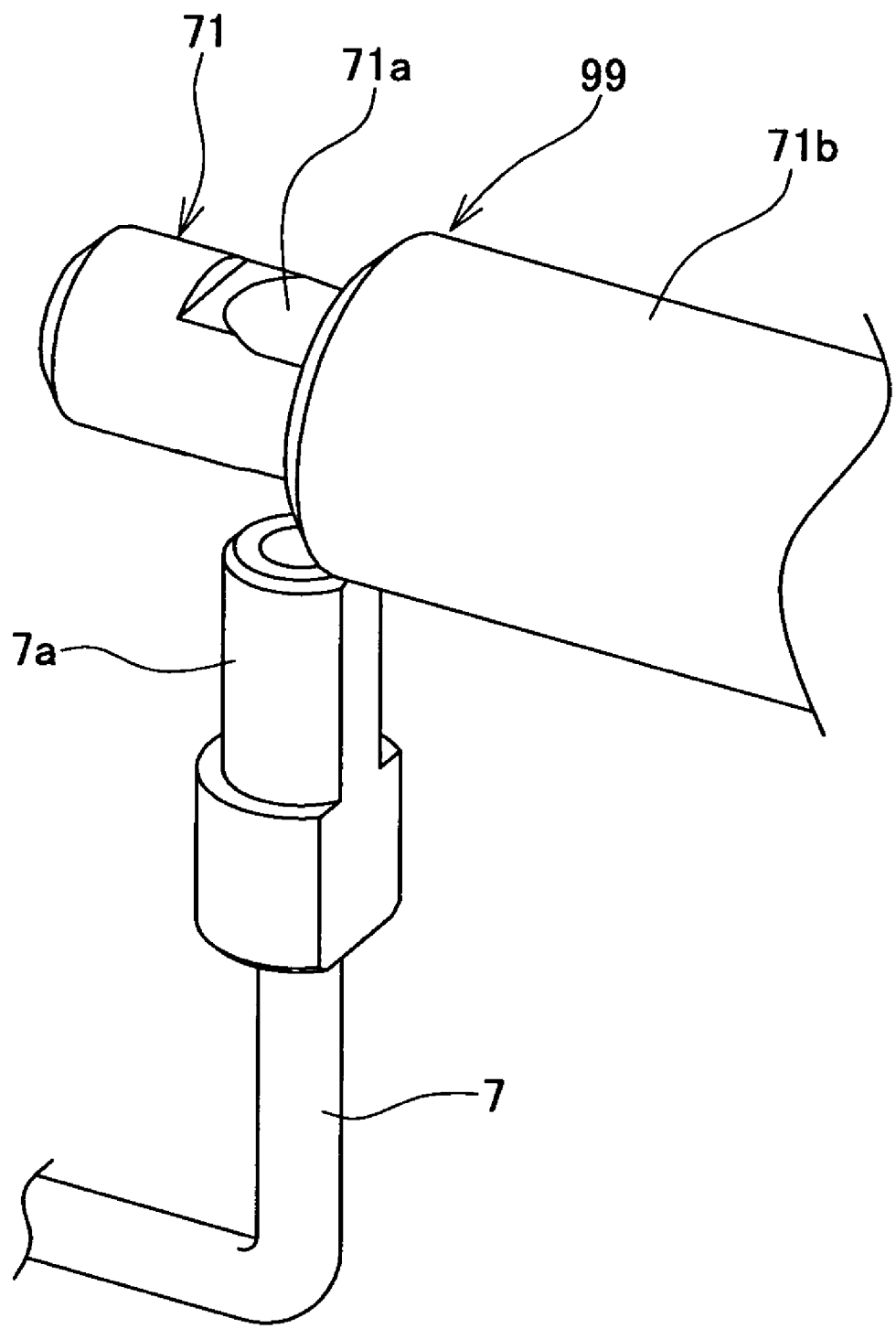
FIG. 13 is a perspective view showing the state prior to connection of the arm part of the solid immersion lens holder and the first arm member of the solid immersion lens moving device as viewed from the rear.
Figure 14:
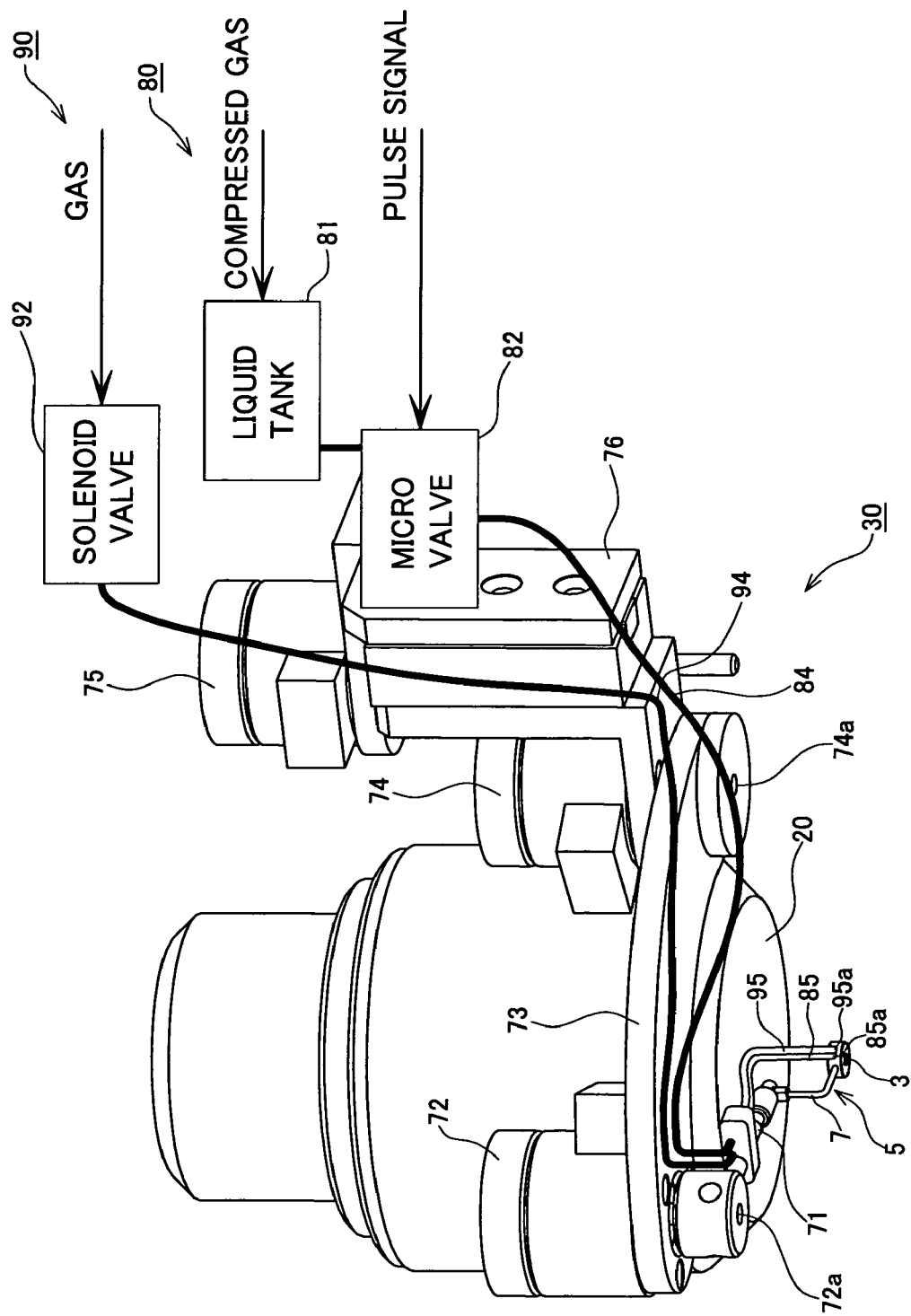
FIG. 14 is a block diagram showing the solid immersion lens moving device and the objective lens along with an optical coupling material supplying means and a drying gas supplying means.
Figure 15:
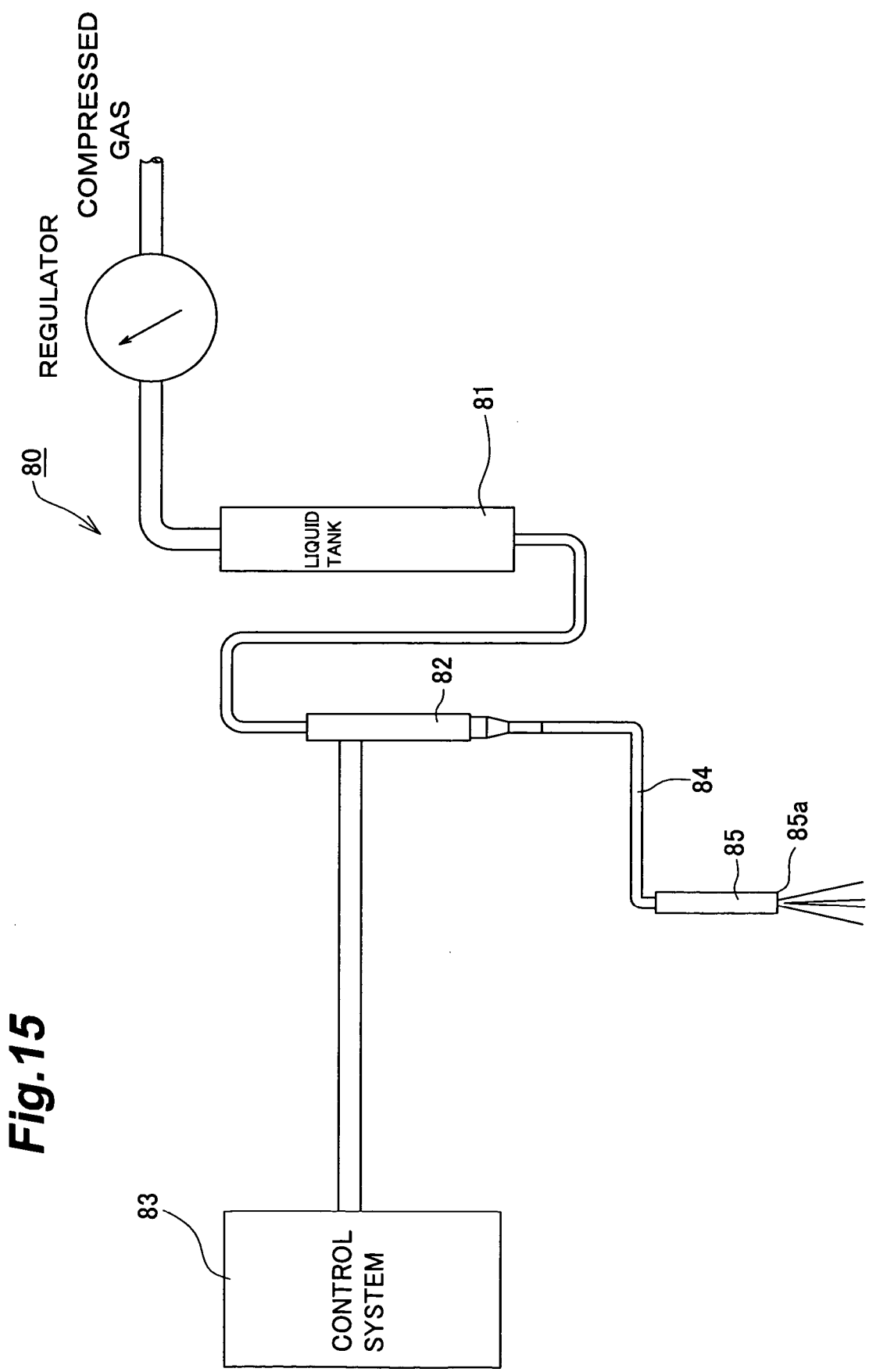
FIG. 15 is a block diagram specifically showing the optical coupling material supplying means.
Figure 16:
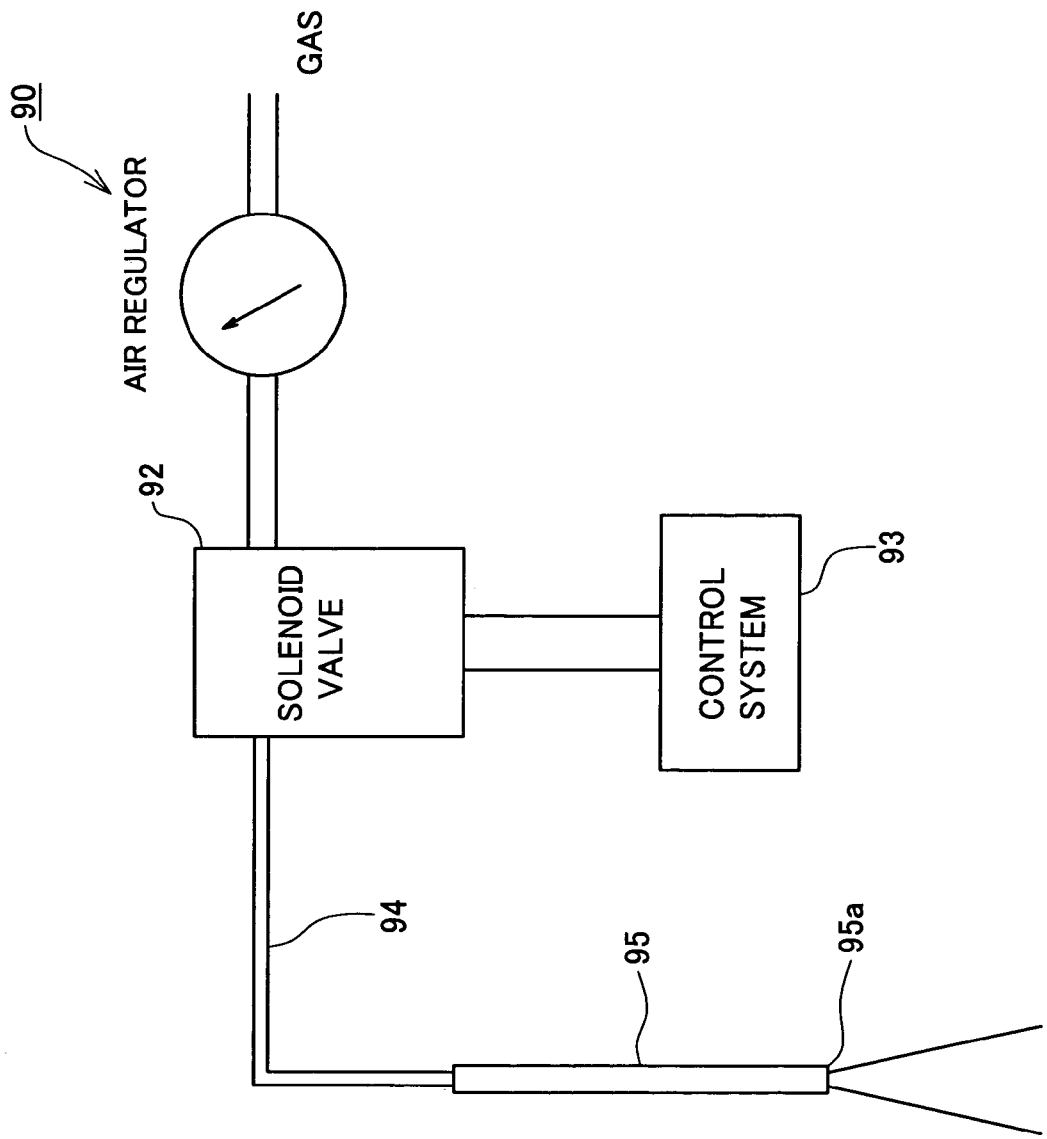
FIG. 16 is a block diagram specifically showing the drying gas supplying means.
Figure 17:
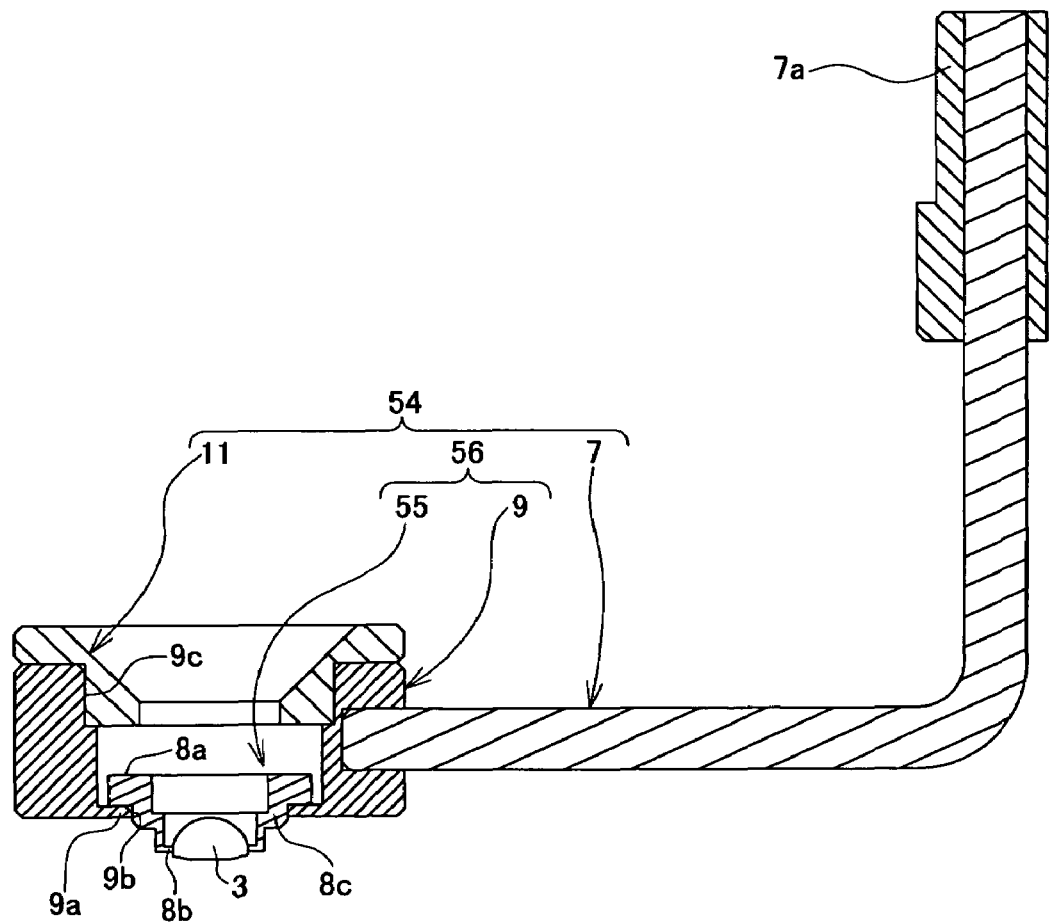
FIG. 17 is a vertical section showing a solid immersion lens holder of a second embodiment of this invention in the state in which a lens is set at a standby position.
Figure 18:
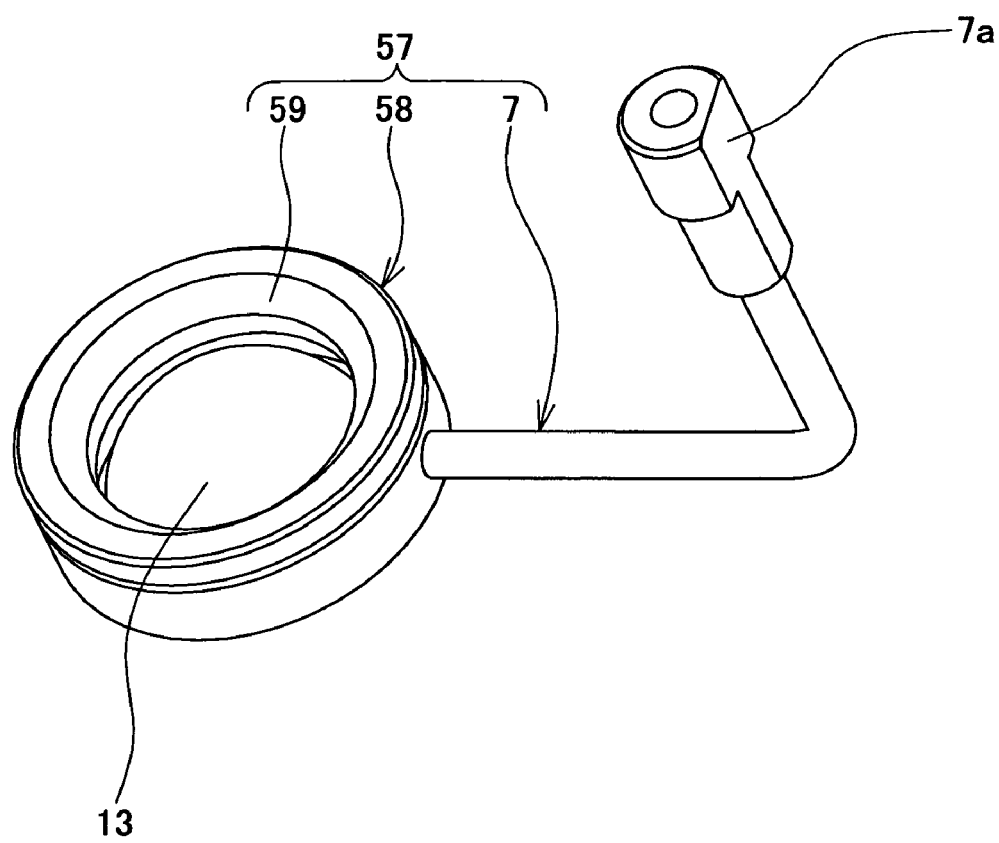
FIG. 18 is a perspective view showing a solid immersion lens holder of a third embodiment of this invention.
Figure 19:
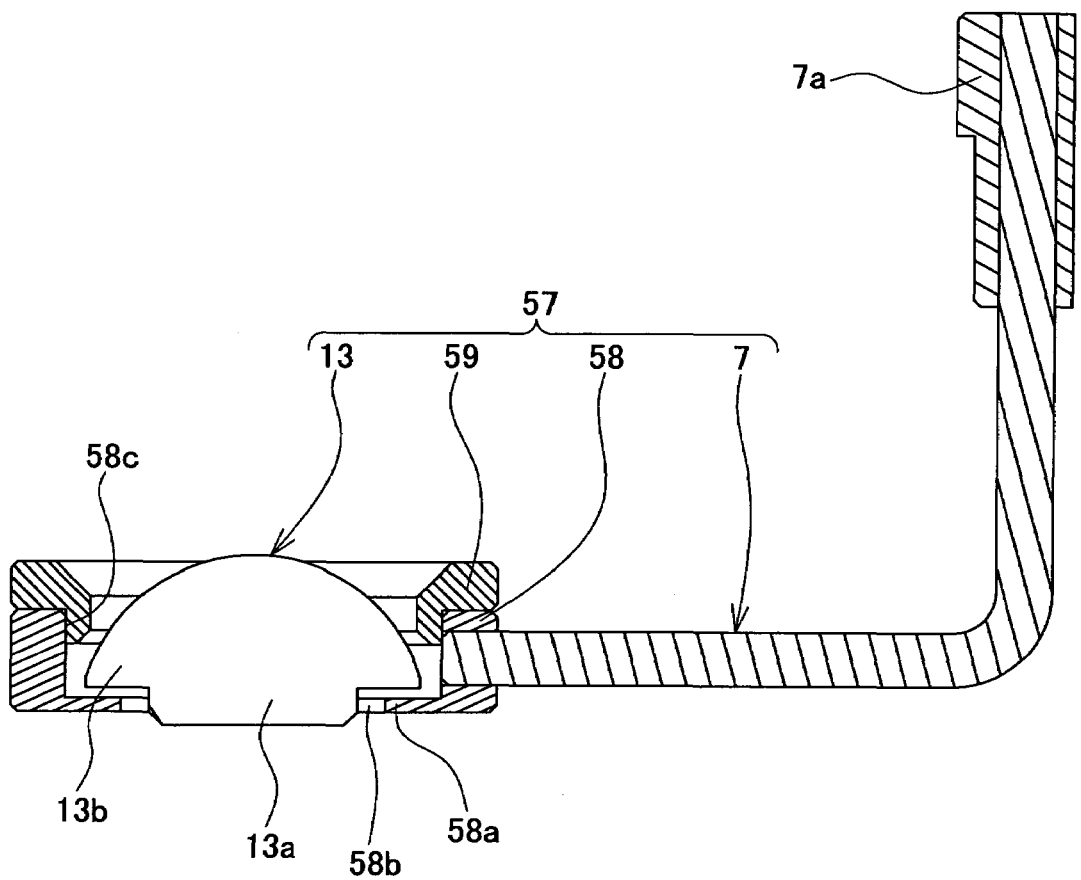
FIG. 19 is a vertical section showing the solid immersion lens holder in the state in which a lens is set at the closely contacting position.
Figure 20:
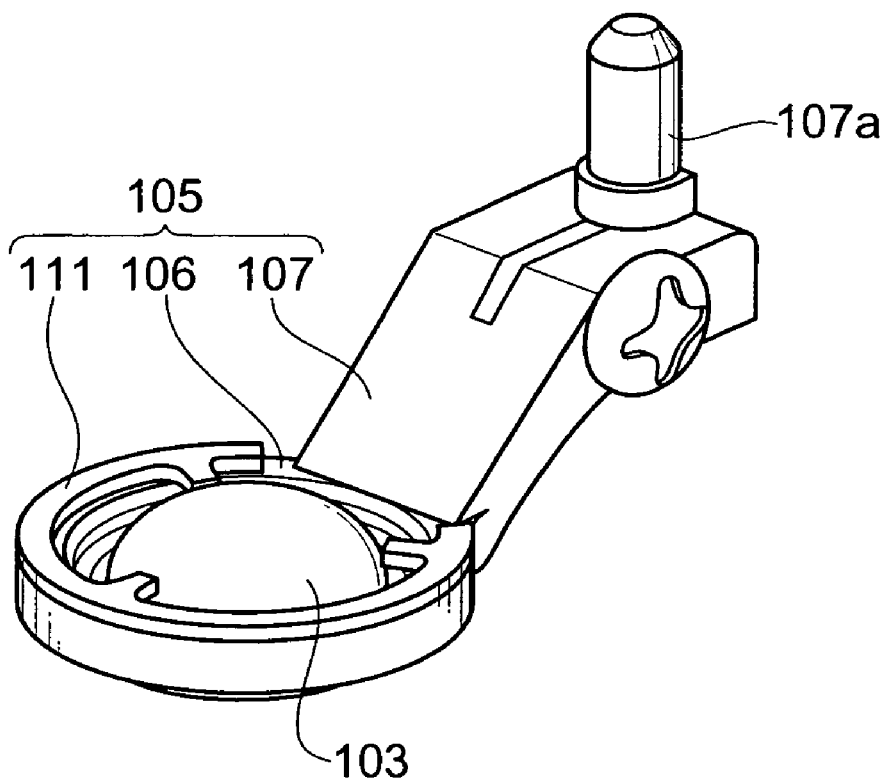
FIG. 20 is a perspective view showing a solid immersion lens holder of a fourth embodiment of this invention.
Figure 21:
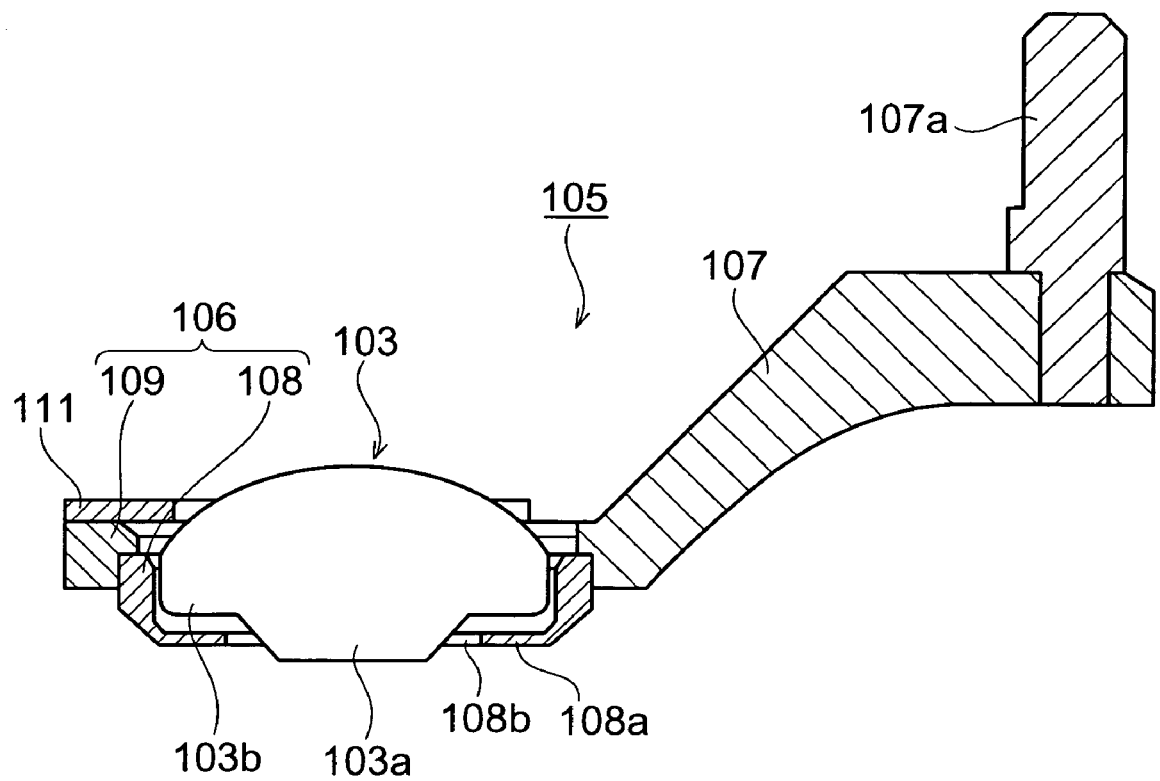
FIG. 21 is a vertical section showing the solid immersion lens holder in the state in which a lens is set at the closely contacting position.
Figure 22:
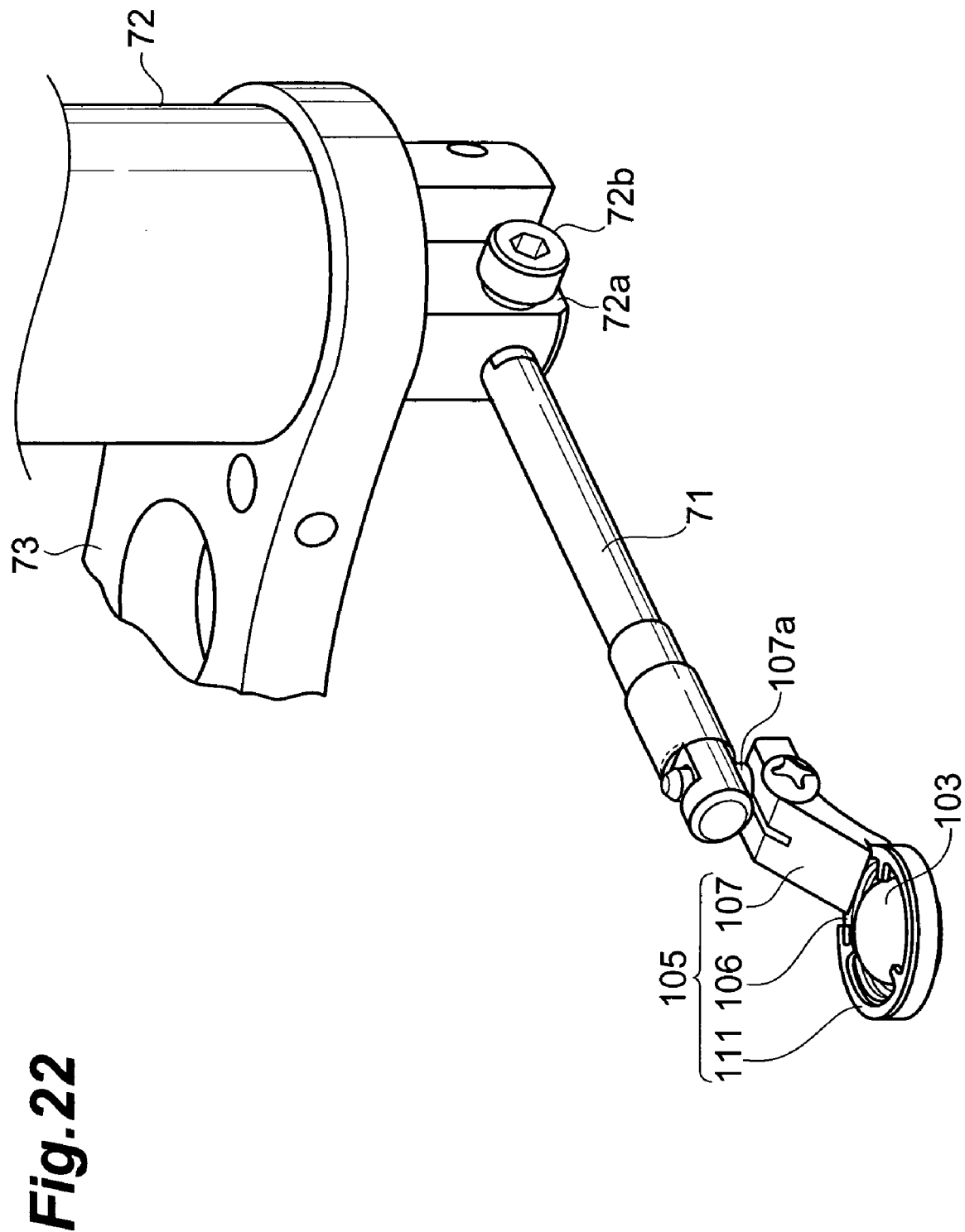
FIG. 22 is a perspective view showing a part at which the solid immersion lens holder and a solid immersion lens moving device are connected.
Figure 23:
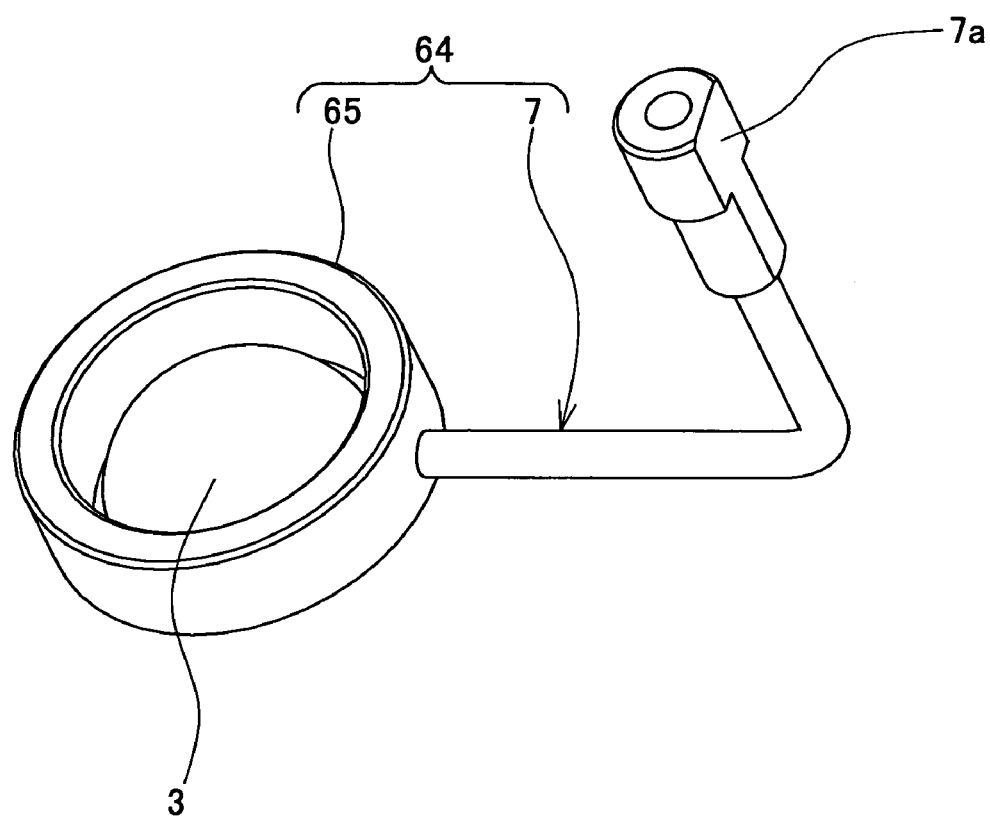
FIG. 23 is a perspective view showing another solid immersion lens holder.
Figure 24:
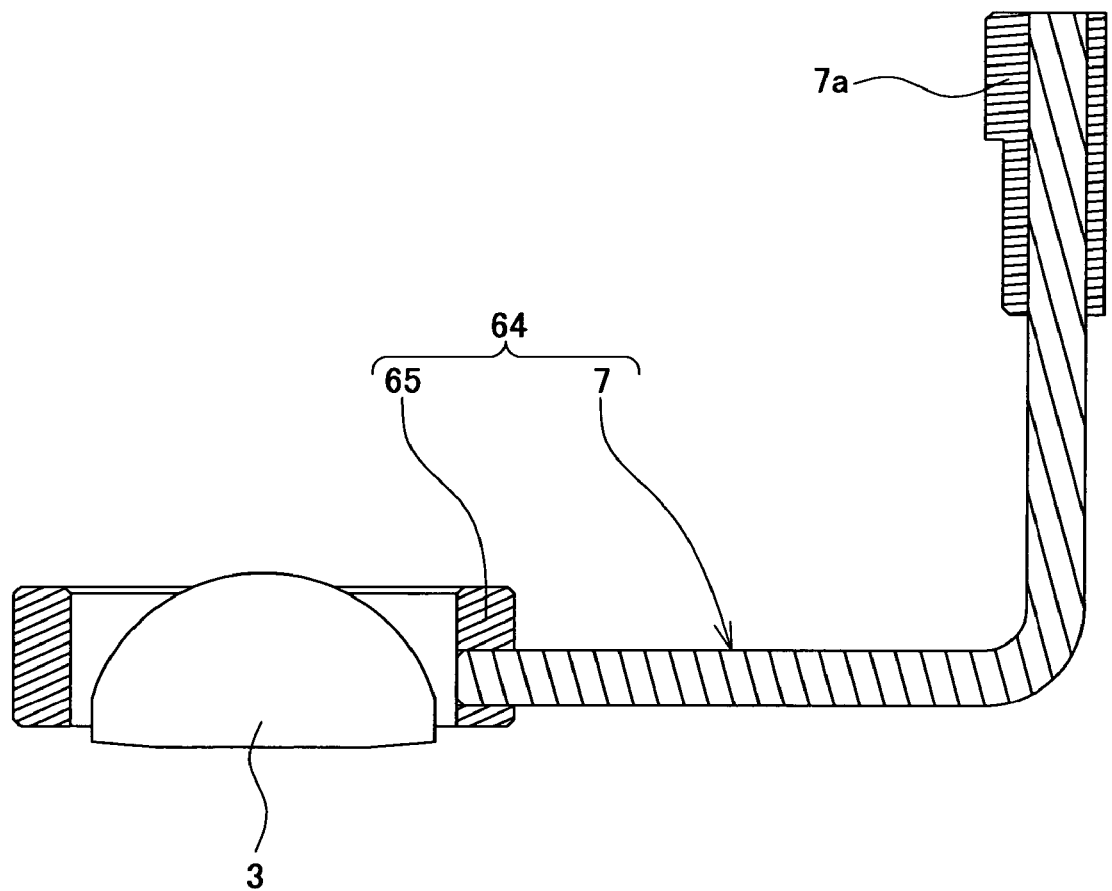
FIG. 24 is a vertical section showing the other solid immersion lens holder in the state wherein a lens is positioned at a closely contacting position.

Preferred embodiments of this invention's solid immersion lens holder shall now be described with reference to FIG. 1 to FIG. 24. FIG. 1 is a block diagram showing a semiconductor inspection device equipped with a solid immersion lens holder of a first embodiment of this invention, FIG. 2 to FIG. 4 are respectively perspective views showing a solid immersion lens moving device and an objective lens, FIG. 5 to FIG. 7 are respectively diagrams of states illustrating moving operations of the solid immersion lens moving device, FIG. 8 to FIG. 10 are respectively diagrams showing the solid immersion lens holder, FIG. 11 to FIG. 13 are respectively perspective views showing a part at which the solid immersion lens holder and the solid immersion lens moving device are connected, FIG. 14 to FIG. 16 are respectively diagrams showing an optical coupling material supplying means and a drying gas supplying means, FIG. 17 is a vertical section showing a solid immersion lens holder of a second embodiment of this invention, FIG. 18 and FIG. 19 are respectively diagrams showing a solid immersion lens holder of a third embodiment of this invention, FIG. 20 to FIG. 22 are respectively diagrams showing a solid immersion lens holder of a fourth embodiment of this invention, and FIGS. 23 and 24 are respectively diagrams showing another solid immersion lens holder. In the respective figures, the same elements shall be provided with the same symbols and redundant description shall be omitted. This invention's solid immersion lens holder is generally applicable to sample observation methods and microscopes, etc., that use a solid immersion lens. However, in the following description, examples of application to semiconductor inspection shall mainly be described.

First, the semiconductor inspection device equipped with the solid immersion lens holder of the first embodiment shall be described. As shown in FIG. 1, semiconductor inspection device 1 is an inspection device, for which the object of observation is a semiconductor device S, wherein a circuit pattern, for example, of a transistor and wiring, etc., is formed, and images of this semiconductor device S are acquired for inspection of the internal information thereof. With this invention, "internal information" shall include circuit patterns of semiconductor devices as well as emission of weak light from semiconductor devices. Such weak light emissions include those caused by an abnormal position due to a defect of a semiconductor device, transient light emission that accompanies the switching operation of a transistor inside a semiconductor device, etc. The generation of heat due to a defect of a semiconductor device is also included.

This semiconductor inspection device 1 is equipped with an observation part A for performing observation of semiconductor device S, a control part B for controlling the operations of the respective parts of observation part A, and an analysis part C for performing the processing, instructing, etc., necessary for the inspection of semiconductor device S. Semiconductor device S is set, with its rear surface facing upward, on a stage 18, provided at observation part A, and in the present embodiment, inspection device 1 is used to inspect the lower surface in the figure of semiconductor device S (integrated circuits, etc., formed on a substrate surface of semiconductor device S).

Observation part A is equipped with a high-sensitivity camera 10 and a laser scanning microscope (LSM) unit 12, which are image acquisition means for acquiring images from semiconductor device S, an optical system 2, which includes an objective lens 20 of a microscope 4 that is positioned between semiconductor device S and high-sensitivity camera 10 and LSM unit 12, a solid immersion lens 3, for obtaining magnified observation images of semiconductor device S, a solid immersion lens manipulator 30, which is a solid immersion lens moving device that moves solid immersion lens 3 in three-dimensional directions, and an X-Y-Z stage 15, which moves the above-mentioned components respectively in orthogonal X, Y, and Z directions.

In addition to the abovementioned objective lens 20, optical system 2 is equipped with a camera optical system 22 and an LSM unit optical system 24. A plurality of objective lenses 20 of different magnifications are provided in a switchable manner. Camera optical system 22 guides light from semiconductor device S that has passed through an objective lens 20 to high-sensitivity camera 10, and high-sensitivity camera 10 thereby acquires an image of a circuit pattern, etc., of semiconductor device S. Meanwhile, LSM unit optical system 24 guides infrared laser light from LSM unit 12 to semiconductor device S by reflecting the light to the objective lens 20 side by means of a beam splitter (not shown) and branches, by means of the beam splitter, a part of reflected light from semiconductor device S that is directed towards high-sensitivity camera 10 via objective lens 20 and guides this light to LSM unit 12.

This LSM unit 12 scans an infrared laser light in the X-Y directions and emits this light towards the semiconductor device S side and detects the reflected light from semiconductor device S by means of a photodetector (not shown). The intensity of this detected light will be an intensity that reflects the circuit pattern of semiconductor device S. Thus by X-Y scanning of semiconductor device S by infrared laser light, LSM unit 12 acquires an image of the circuit pattern, etc., of semiconductor device S.

X-Y-Z stage 15 is for moving high-sensitivity camera 10, LSM unit 12, optical system 2, solid immersion lens 3, solid immersion lens manipulator 30, etc., as necessary in each of the X-Y directions (horizontal directions; directions parallel to semiconductor device S, which is the observed object) and the Z direction (vertical direction) orthogonal to the X-Y directions.

Solid immersion lens 3 is a microlens having a hemispherical shape (see FIG. 9) or a hyperhemispherical shape, called a Weierstrass sphere, of a size of approximately 1 mm to 5 mm. By the bottom surface of this solid immersion lens 3 coming into close contact with an observation position (the illustrated upper surface) for observing semiconductor device S, a magnified observation image of the surface (the illustrated lower surface) of semiconductor device S at the rear side is obtained.

Specifically, a solid immersion lens that is used in a semiconductor inspection device is formed of a high refractive index material that is practically the same or close to the substrate material of the semiconductor device in refractive index. Representative examples of this material include Si, GaP, GaAs, etc.

By putting such a microscopic optical element into close optical contact with a substrate surface of a semiconductor device, the semiconductor substrate itself can be put to use as a part of the solid immersion lens. In rear surface analysis of a semiconductor device using a solid immersion lens, in setting the focal point of an objective lens to an integrated circuit formed on a surface of a semiconductor substrate, the effect of the solid immersion lens enables the focal point position to be set so as not to be as deep as that in air. Light flux of high NA can thus be made to pass through the substrate and the achievement of high resolution by use of short wavelengths can be anticipated.

The lens shape of such a solid immersion lens 3 is determined by conditions with which aberrations are eliminated. With a solid immersion lens having a hemispherical shape, the sphere center thereof becomes the focal point. In this case, both the numerical aperture NA and the magnification are multiplied by n. On the other hand, with a solid immersion lens with a hyperhemispherical shape, the focal point is located at a position shifted downward by R/n from the sphere center. In this case, both the numerical aperture NA and the magnification are multiplied by $n^2$. Solid immersion lens 3 of conditions besides the above, such as that with which the focal point is positioned between the sphere center and the position shifted downward by R/n from the sphere center, etc., may be used in accordance with the specific observation conditions, etc., for semiconductor device S.

Solid immersion lens holder 5 (see FIG. 8 to FIG. 10) is for favorably supporting solid immersion lens 3. Also, solid immersion lens manipulator 30 (see FIG. 2 to FIG. 7), which moves this solid immersion lens holder 5 in three-dimensional directions, is for moving solid immersion lens 3, which is supported by solid immersion lens holder 5, to the respective predetermined positions of: an inserted position, which is a position between semiconductor device S and objective lens 20 and includes an optical axis from semiconductor device S to objective lens 20; a closely contacting position, at which the bottom surface of solid immersion lens 3 is put in close contact with an observation position of semiconductor device S; a standby position, which lies outside the above-mentioned optical axis; an exchange position for exchanging solid immersion lens 3, etc. This solid immersion lens holder 5 and solid immersion lens manipulator 30 shall described in detail later.

Control part B is equipped with a camera controller 51a, a laser scan (LSM) controller 51b, a stage controller 52, and a manipulator controller 53. Camera controller 51a and LSM controller 51b control the operations of high-sensitivity camera 10 and LSM unit 12, respectively, and thereby control the execution of the observation of (acquisition of images from) semiconductor device S, which is carried out in observation part A, as well as the setting of the observation conditions, etc.

Stage controller 52 controls the operation of X-Y-Z stage 15 and thereby controls the movement, positioning, focusing, etc., of high sensitivity camera 10, LSM unit 12, optical system 2, etc., to positions corresponding to the observation position of semiconductor device S. Manipulator controller 53 controls the operation of solid immersion lens manipulator 30 and thereby controls movements of solid immersion lens 3 to the abovementioned predetermined positions as well as fine adjustment of the closely contacting position of solid immersion lens 3, etc. (details shall be provided later).

Analysis part C is equipped with an image analysis part 61 and an instructing part 62 and is arranged from a computer. Image analysis part 61 performs the necessary analysis processes, etc., on image information from camera controller 51a and laser scan controller 51b. Instructing part 62 references the contents input by an operator, the contents of analysis by image analysis part 61, etc., and provides the necessary instructions concerning the execution of inspection of semiconductor device S at observation part A, via the control part B. The image, data, etc., that have been acquired or analyzed at analysis part C are displayed as necessary on a display device 63, connected to analysis part C.

Solid immersion lens holder 5 and solid immersion lens manipulator 30, which make up the characteristics of the present embodiment, shall now be described in detail.

As shown in FIG. 8 and FIG. 9, solid immersion lens holder 5 is equipped with a holder 6, which is formed to a substantially cylindrical form and supports solid immersion lens 3, and an arm part 7, which holds this holder 6. Since this solid immersion lens holder 5 comes in contact with an optical contact liquid to be described below in some cases, it is formed, for example, of stainless steel, aluminum, or other metal of high corrosion resistance or of a resin, such as acrylic resin, PET, polyethylene, polycarbonate, etc., which can be formed readily in accordance with the shape of the solid immersion lens.

As shown in FIG. 9, holder 6 is equipped with a first holder 8, which holds solid immersion lens 3, and a second holder 9, which supports this first holder 8. This first holder 8 and second holder 9 are formed to a substantially cylindrical form so as not to obstruct the optical path with respect to semiconductor device S.

First holder 8 is equipped on the outer peripheral surface of an upper part thereof with an annular collar part 8a, which protrudes outwards, and is equipped on the bottom surface with an annular collar part 8b, which is directed inwards, and solid immersion lens 3 is held by being fixed, for example, by an adhesive agent, etc., to first holder 8 in a state in which the bottom surface of solid immersion lens 3 protrudes downward through an opening formed at the inner periphery of annular collar part 8b.

Second holder 9 is equipped at its bottom surface with an inwardly directed annular collar part 9a. Annular collar part 8a of first holder 8 is set on annular collar part 9a of second holder 9 and first holder 8 and solid immersion lens 3 are supported in the gravity direction by second holder 9 in a state wherein a lower part of first holder 8 is protruded downward through an opening 9b, formed at the inner part of annular collar part 9a.

Here, if the outer diameter of the lower part of first holder 8 is A, the outer diameter of annular collar part 8a of first holder 8 is B, and the inner diameter of opening 9b of second holder 9 is C, these are set to satisfy the relationship, A<C<B. First holder 8 is made free with respect to second holder 9 and yet the falling-off of first holder 8 downwards from second holder 9 is prevented.

Second holder 9 is also equipped at an opening 9c at an upper part thereof with a cap 11, which is mounted by fitting, screwing, etc., and is for preventing the falling off of the solid immersion lens. As with first holder 8 and second holder 9, this cap 11 is formed to a substantially cylindrical form, and if the inner diameter of cap 11 is D, it is set to satisfy the relationship, D<B. Thus by means of cap 11, separation, such as the springing out of first holder 8, which holds solid immersion lens 3, through opening 9c at the upper part of second holder 9, is thus prevented and the loss of the solid immersion lens is prevented without obstruction of the optical path for semiconductor device S.

Also, arm part 7 is arranged by bending a round bar to a substantially L-like shape and extends outward from second holder 9 with one end thereof being directed upwards and the other end thereof being fixed to a side part of second holder 9. As shown in FIG. 8 and FIG. 9, a rotation stopping part 7a, with which a part of a side face of a pipe is made a flat surface, is fixed, for example, by fitting, etc., onto one end of arm part 7 as a rotation stop for arm part 7 and holder 6. Though arm part 7 is arranged to be substantially L-like in shape and has one end thereof extending upward, it may be arranged to extend within the X-Y plane instead.

As shown in FIG. 11, arm part 7, which makes up this solid immersion lens holder 5, is detachably connected to one end of a first arm member 71 of solid immersion lens manipulator 30. As shown in FIG. 12 and FIG. 13, connecting part 99, which connects this first arm member 71 with solid immersion lens holder 5, is equipped at first arm member 71 with a through hole 71a, through which rotation stopping part 7a of arm part 7 can be inserted in the vertical direction, and a fastening part 71b, which has its front end face formed to a flat surface and which narrows or spreads through hole 71a by being screwed forward or backward (advancing or retreating).

In this arrangement, rotation stopping part 7a, which has been inserted in through hole 71a, is fixed to first arm member 71 by advancing fastening part 71b by turning it in the fastening direction. In this state, the flat surface of rotation stopping part 7a of arm part 7 is made to contact and then put in close contact with the flat surface at the front end of fastening part 71b, thereby arranging a rotation stop for arm part 7 and solid immersion lens holder 5. Also, arm part 7, which has thus been fixed to first arm member 71, can be released and extracted from first arm member 71, for example, for exchange of solid immersion lens 3, etc., by retreating fastening part 71b by rotating it in the opposite direction.

Solid immersion lens manipulator 30, which holds solid immersion lens holder 5 by means of this connecting part 99, freely moves solid immersion lens 3 in solid immersion lens holder 5 to the respective abovementioned predetermined positions (inserted position, closely contacting position, standby position, and exchange position) in three-dimensional directions as shown in FIG. 1 to FIG. 7. As shown in FIG. 2 to FIG. 7, this solid immersion lens manipulator 30 is equipped with the above-described first arm member 71, to which solid immersion lens holder 5 is mounted, a first arm member rotation source 72, which rotates this first arm member 71 within the X-Y plane, a second arm member 73, which holds this first arm member rotation source 72, a second arm member rotation source 74, which rotates this second arm member 73 within the X-Y plane, and a Z-direction movement source 75, which moves this second arm member rotation source 74 in the Z-direction that is orthogonal to the X-Y plane, and this Z-direction movement source 75 is deemed to be at the base end side and the moving first arm member 71 is deemed to be the terminal end side.

Specifically, Z-direction movement source 75 is arranged from a Z-axis motor, etc., with which a movement shaft 75a is moved in the Z-direction, for example, by a feeding screw, etc., and is mounted to microscope 4 as the main device body side via a supporting part 76. This supporting part 76 is detachably mounted to microscope 4, for example, by being screwed on, etc., so as to be convenient, for example, for carrying out microscopic observation upon removing solid immersion lens manipulator 30 or carrying out microscopic observation upon mounting another lens moving device.

Second arm member rotation source 74 is connected via a supporting part 77 to movement shaft 75a of Z-direction movement source 75. This second arm member rotation source 74 is arranged from a motor, etc., with which the output shaft is, for example, a rotation axis 74a, which rotates in the forward and reverse directions (needs only to rotate within a predetermined range), and is moved in the Z-direction by the driving of Z-direction movement source 75.

One end of second arm member 73 is connected to this rotation axis 74a of second arm member rotation source 74. Though details shall be given later, this second arm member 73 is arranged in a curving manner so that second arm member 73 can be moved away readily from the field of view of the observation position of semiconductor device S (field of view of objective lens 20) as shown in FIG. 6.

First arm member rotation source 72 is fixed to the other end of second arm member 73 as shown in FIG. 2 to FIG. 7. This first arm member rotation source 72 is arranged from a motor, etc., with which the output shaft is, for example, a rotation axis 72a, which rotates in the forward and reverse directions (needs only to rotate within a predetermined range). Rotation axis 72a of first arm member rotation source 72 and rotation axis 74a of second arm member rotation source 74 are thus positioned non-coaxially. By the driving of second arm member rotation source 74, first arm member rotation source 72 is rotated along with second arm member 73 within the X-Y plane and with rotation axis 74a of second arm member rotation source 74 as the supporting point.

The other end of the above-described first arm member 71 is connected to rotation axis 72a of first arm member rotation source 72. This first arm member 71 is rotated within the X-Y plane and with rotation axis 72a of first arm member rotation source 72 as the supporting point by the driving of first arm member rotation source 72.

Thus by the driving of first arm member rotation source 72 and second arm member rotation source 74, solid immersion lens 3, supported by solid immersion lens holder 5 connected to one end of first arm member 71, is moved in synthetic directions, resulting from the synthesis of the respective rotations, within the X-Y plane, is also moved in the Z-direction by the driving of Z-direction movement source 75, and is consequently moved freely to the respective predetermined positions in three-dimensional directions.

Furthermore, solid immersion lens manipulator 30 of this embodiment is used for obtaining a magnified observation image by means of solid immersion lens 3, and, as shown in FIG. 14, is equipped with an optical coupling material supplying means 80, which supplies an optical coupling material for optically coupling solid immersion lens 3 to the observation position of semiconductor device S, and a drying gas supplying means 90, which supplies a gas for drying this optical coupling material.

When an optical coupling material is interposed between a solid immersion lens and an observed object and light of the critical angle or more with respect to the contact surface of the solid immersion lens and the observed object is made to propagate inside the solid immersion lens, a light flux of high numerical aperture (NA) can be passed through and thus the inherent resolution of the solid immersion lens can be exhibited.

Optical coupling material supplying means 80 supplies an optical contact liquid (comprising, for example, water and a surfactant), which contains, for example, amphiphilic molecules, to the observation position of semiconductor device S immediately prior to bringing solid immersion lens 3 into close contact with the observation position. With this optical coupling material supplying means 80, an optical contact liquid is contained inside a compact dedicated liquid tank 81, which has a volume, for example, of 1 cc and is fixed to supporting part 76 as shown in FIG. 14 and FIG. 15. The contained optical contact liquid is then put in a pressurized state by means of a compressed gas, such as compressed air, etc., and by supplying a pulse signal from a control system 83 to a microvalve 82, which, for example, is a solenoid valve that is equipped with a spring, is fixed to supporting part 76, and is connected to the exit of liquid tank 81, the optical contact liquid is sprayed from a supply port 85a at the tip of an optical coupling material supply pipe 85, which is connected to microvalve 82 via a flexible pipe 84 and is fixed to first arm member 71 as shown in FIG. 2 to FIG. 7.

Since the optical contact liquid, which contains amphiphilic molecules, is low in surface tension, it spreads across the semiconductor substrate, which is a hydrophobic surface. In the process of drying this optical contact liquid, forces that tend to maintain the wettability of the surface of the semiconductor substrate and the bottom surface of the solid immersion lens become dominant. The vaporization of mainly the water of the optical contact liquid thus progresses while the surface interval between the bottom surface of the solid immersion lens and the semiconductor substrate surface narrows. In the final stage, the solid immersion lens and the semiconductor substrate become optically coupled.

It is considered that in this state, van der Waals forces act between water molecules and the hydrophilic groups of the amphiphilic molecules, which have become physically adsorbed onto the semiconductor substrate surface and the bottom surface of the solid immersion lens, and due to the binding of water molecules, the vaporization thereof is stopped. The distance between the solid immersion lens and the semiconductor substrate at this point can be made, for example, $\frac{1}{20}\lambda$ ($\lambda$: illumination wavelength) or less, and as a result, evanescent coupling as well as physical fixation of the solid immersion lens and the semiconductor substrate are achieved. "Optical contact" in this invention shall refer to a state wherein optical coupling is achieved by evanescent coupling.

As an optical coupling material besides the above-described optical contact liquid, a refractive index matching fluid (index matching liquid, etc.), such as that described in Japanese Patent Publication No. H7-18806 and with which refractive index matching of a solid immersion lens and a semiconductor substrate is achieved, can be cited. In the present Specification, a refractive index matching fluid differs from an optical contact liquid, and whereas the former realizes a high NA by means of the refractive index of a fluid, the latter has a role of aiding evanescent coupling. Though an embodiment using an optical contact liquid shall be described in detail here, the same effects can be realized with an embodiment using a refractive index matching fluid. However, in such a case, since the fluid does not have to be dried necessarily, an embodiment is possible wherein drying gas supplying means 90 is omitted.

This optical coupling material supply pipe 85 is fixed to first arm member 71 and supply port 85a at the front end thereof is set near solid immersion lens holder 5 as shown in FIG. 2 to FIG. 7. The pipe thus moves along with solid immersion lens 3 and is enabled to spray the optical contact liquid towards the targeted observation position. This optical contact liquid is controlled in sprayed amount by control of the duration during which the pulse signal is on and is sprayed from supply port 85a at a precision of the picoliter level. The sprayed amount of optical contact liquid is determined suitably in accordance with the size of solid immersion lens 3. Also, this optical contact liquid is preferably exchanged as suited in order to prevent decomposition, change of concentration, and clogging by the liquid.

In place of microvalve 82, an optical coupling material supplying means may be used wherein a tubing type microdispenser is used and, without pressurizing liquid tank 81 by compressed gas, the tube of the tubing type microdispenser is mechanically squeezed to make the optical contact liquid inside liquid tank 81 drip towards the observation position from supply port 85a at the front end of optical coupling material supply pipe 85 via flexible pipe 84. In this case, the capacity of liquid tank 81 is set to a few dozen cc's and the dripping amount is determined as suited according to the size of solid immersion lens 3.

Drying gas supplying means 90 supplies a gas for rapidly drying the optical contact liquid between the observation position of semiconductor device S and solid immersion lens 3. As shown in FIG. 14 and FIG. 16, with this drying gas supplying means 90, ON/OFF signals are supplied from a control system 93 to a solenoid valve 92, fixed to support part 76, to make a gas, such as compressed dried air, nitrogen gas, etc., be blown out from a supply port 95a at the tip of a gas supply pipe 95, which is connected to solenoid valve 92 via a flexible pipe 94 and is fixed to first arm member 71 as shown in FIG. 2 to FIG. 7.

As with optical coupling material supply pipe 85, drying gas supply pipe 95 is fixed to first arm member 71 and supply port 95a at the front end thereof is set near solid immersion lens holder 5 as shown in FIG. 2 to FIG. 7. The pipe thus moves along with solid immersion lens 3 and is enabled to blow gas towards the targeted position between the observation position of the semiconductor device and solid immersion lens 3.

The actions of semiconductor inspection device 1, having the above-described arrangement, shall now be described. The description shall start from the state, shown in FIG. 5, wherein solid immersion lens 3 is positioned at the standby position. At this standby position, first and second arm members 71 and 73 are folded and solid immersion lens 3 and first and second arm members 71 and 73 are set outside the view field of objective lens 20. At this point, first holder 8, holding solid immersion lens 3, has its annular collar part 8a set on annular collar part 9a of second holder 9 and first holder 8 and solid immersion lens 3 are supported in the gravity direction by second holder 9 as shown in FIG. 9. In this standby state, a pattern image, which is a normal observation image of the observation position of semiconductor device S is acquired and then, for example, a voltage is applied, etc., to semiconductor device S and the image in this process is acquired.

Here, if there is an abnormal position in semiconductor device S, an emission image will be obtained, and the abnormal position of semiconductor device S can thus be specified by overlapping the normal observation image with the image obtained when a voltage was applied. In the case where there is an abnormal position, high-sensitivity camera 10, LSM unit 12, optical system 2, solid immersion lens holder 5, solid immersion lens manipulator 30 are moved by means of X-Y-Z stage 15 so that objective lens 20 will be positioned coaxial to the abnormal position.

Solid immersion lens 3 is then set with respect to the observation position of semiconductor device S. In this case, firstly, first and second arm member rotation sources 72 and 74 of solid immersion lens manipulator 30 are driven and by thus rotating first and second arm members 71 and 73, solid immersion lens 3, at the standby position, is moved to the inserted position, between semiconductor device S and objective lens 20 and containing the optical axis from semiconductor device S to objective lens 20 as shown in FIG. 3, FIG. 4 and FIG. 6. Here, since second arm member 73 is formed to have a curved shape, second arm member 73 is kept readily away from the view field without obstructing the view field of objective lens 20 as shown in FIG. 6.

When solid immersion lens 3 has thus been inserted at the inserted position, Z-direction movement source 75 of solid immersion lens manipulator 30 is driven to lower solid immersion lens 3. When solid immersion lens 3 then approaches the observation position, optical contact liquid is supplied to the observation position, which is the targeted position, from optical coupling material supplying means 80 and solid immersion lens 3 is set on the observation position and positioned at the closely contacting position.

When solid immersion lens 3 is thus set on the observation position of semiconductor device S, solid immersion lens 3 and first holder 8, which are supported in the gravity direction by second holder 9, are raised by semiconductor device S as shown in FIG. 10.

Fine adjustment of the closely contacting position of solid immersion lens 3 is then carried out. This fine adjustment is carried out by minutely moving solid immersion lens holder 5 in the Z-direction by the driving of Z-direction movement source 75 of solid immersion lens manipulator 30 and minutely swinging first arm member 71 by means of first arm member rotation source 72 and these are carried out so that first holder 8, holding solid immersion lens 3, will be spaced apart in the X-Y-Z directions from second holder 9 and thus will not contact second holder 9. Specifically, an image containing reflected light from solid immersion lens 3 is acquired, and the reflected light from the reflecting surfaces of various parts of solid immersion lens 3 in the reflected light image, contained in the abovementioned image, are used as guides.

More specifically, analysis is performed automatically or based on instructions from an operator on the acquired image by means of image analysis part 61 of analysis part C to determine the position of the center of gravity of the reflected light image. Then by means of instructing part 62 of analysis part C, solid immersion lens manipulator 30 is instructed via manipulator controller 53 to perform fine adjustment of the closely contacting position of solid immersion lens 3 so that the center of gravity position of the reflected light image obtained at image analysis part 61 matches the observation position at semiconductor device S. The positioning of solid immersion lens 3 with respect to the observation position of semiconductor device S and objective lens 20 is thus carried out.

Since solid immersion lens 3 and first holder 8 are put in a free state with respect to second holder 9 in a state in which they are raised by semiconductor device S, only the self-weights of solid immersion lens 3 and first holder 8 act on the observation position of semiconductor device S and thus the application of an excessive force is eliminated and yet solid immersion lens 3 is put in close contact in conformance (compliance) to the observation position.

Gas is then supplied by means of drying gas supplying means 90 to the region at which solid immersion lens 3 contacts the observation position, which is the targeted position, and by thus drying the optical contact liquid, solid immersion lens 3 is rapidly put into definite, close contact with the observation position of semiconductor device S. Since solid immersion lens 3 is thus put into definite, close contact with the observation position of semiconductor device S by means of the optical contact liquid from optical coupling material supplying means 80, high-precision observation is enabled, and since the drying of the optical contact liquid is promoted by the gas from drying gas supplying means 90, immediate execution of observation is enabled.

When close contact of solid immersion lens 3 with the observation position is thus achieved, adjustment of the distance between semiconductor device S on and with which solid immersion lens 3 is set and put in close contact, and objective lens 20, is instructed from instructing part 62 to X-Y-Z stage 15 via stage controller 52 to perform focusing. In this process, since solid immersion lens manipulator 30 and solid immersion lens 3 move in the Z-direction along with objective lens 20, solid immersion lens 3 is made to move in the opposite Z-direction by means of solid immersion lens manipulator 30 so as to maintain the close contact of solid immersion lens 3 with the observation position. A magnified observation image of the observation position is then acquired via optical system 2, which includes objective lens 20 and solid immersion lens 3 that is put in close contact with the observation position of semiconductor device S, and high resolution observation is carried out.

During this observation, since solid immersion lens 3 and first holder 8 are put in a free state with respect to second holder 9 as described above, temperature drifts at the second holder 9 side or the semiconductor device S side are cut off with respect to the counterpart side and the influences of these temperature drifts are thus eliminated.

For observation of the next observation position, the optical contact liquid is supplied again from optical coupling material supplying means 80. The close contact of solid immersion lens 3 with the observation position is thereby released, and thereafter, solid immersion lens holder 5 is moved by solid immersion lens manipulator 30 by the reverse procedures as the procedures described above to move solid immersion lens 3 to the standby position shown in FIG. 5. Subsequently, the same procedures as those described above are repeated.

In place of the optical contact liquid, the solvent thereof may be used to release the optical contact. The optical contact is released by wetting the contacting portion with the optical contact liquid or the solvent thereof since the optical contact liquid or solvent thereof reenters into the boundary surface between the solid immersion lens and the semiconductor device and destroys the optically coupled state and the physically fixed state. By this method, the solid immersion lens and the semiconductor device can be separated without applying an excessive force. Since the semiconductor device and the solid immersion lens will thus not become flawed, the solid immersion lens can be reused.

Here, if the need to exchange solid immersion lens 3 arises, first arm member rotation source 72 of solid immersion lens manipulator 30 is driven to rotate first arm member 71 to move solid immersion lens 3 from the standby position shown in FIG. 5, at which connecting part 99 is positioned close to a lower part of second arm member 73 and is difficult to handle, to the lens exchange position shown in FIG. 2 and FIG. 7. Connecting part 99 is moved outward greatly from near the lower part of second arm member 73 and solid immersion lens holder 5 is exchanged together with arm part 7. Since connecting part 99 is set at a handling position in the process of lens exchange, the detachment and attachment of arm part 7 of solid immersion lens holder 5 with respect to first arm member 71 is facilitated, and since solid immersion lens holder 5 is exchanged along with arm part 7, the minute solid immersion lens 3 does not have to be handled and the exchange of the lens is thus facilitated.

Thus with solid immersion lens holder 5 of the present embodiment, only the self-weights of solid immersion lens 3 and first holder 8 act on the observation position of semiconductor device S and the application of an excessive pressure is thus eliminated. Damaging of semiconductor device S can thus be prevented. Also, solid immersion lens 3 is put in close contact in conformance (compliance) with the observation position and yet temperature drifts at the second holder 9 side or the semiconductor device S side are cut off from the counterpart side and thus the influences of such temperature drifts are eliminated. High-precision observation is thus enabled without peeling off of solid immersion lens 3 from the observation position.

Also, with solid immersion lens manipulator 30 of the present embodiment, solid immersion lens 3 is moved to predetermined positions within the X-Y plane by rotation of first and second arm members 71 and 73. There is thus no need to make the component parts long in the orthogonal X and Y directions, and a simple arrangement that occupies a small area is provided. Compactness of the device can thus be realized while realizing low cost.

Also, with semiconductor inspection device 1, equipped with this solid immersion lens manipulator 30, when both an observation image, which is taken in the normal state in which solid immersion lens 30 is not set between semiconductor device S and objective lens 20, and a magnified observation image, which is taken in the state in which solid immersion lens 3 is inserted, are to be acquired, these images can be acquired readily. Also, in this case, since high resolution observation is carried out by the magnified observation image, inspection using semiconductor inspection device 1 can be carried out readily and with high precision.

FIG. 17 is a vertical section showing a solid immersion lens holder of a second embodiment of this invention in the state in which a lens is set at a standby position. This solid immersion lens holder 54 of the second embodiment differs from solid immersion lens holder 5 of the first embodiment in that a first holder 55, with which an annular step part 8c is formed in connection to the inner side of the lower surface of a collar part 8a, is used in place of first holder 8, and a holder 56 is arranged from this first holder 55 and second holder 9. The outer diameter of this annular step part 8c of first holder 55 is made slightly smaller than the inner diameter of opening 9b of second holder 9.

Needless to say, even with the present arrangement, the same effects as those of the first embodiment can be obtained. In addition, since the spacing (spacing in the X-Y directions) between first holder 55 and second holder 9 is made minute by the provision of annular step part 8c, the merit that it suffices to perform fine adjustment of the close contact position of solid immersion lens 3 just in the Z-direction by means of solid immersion lens manipulator 30 is provided.

FIG. 18 is a perspective view showing a solid immersion lens holder of a third embodiment of this invention, and FIG. 19 is a vertical section showing the solid immersion lens holder in the state in which a lens is set at a closely contacting position. Solid immersion lens holder 57 of this third embodiment differs from solid immersion lens holder 5 of the first embodiment mainly in that a solid immersion lens 13 that differs in shape from solid immersion lens 3 is used, and accordingly, a single holder 58 is used in place of first and second holders 8, 9 to support solid immersion lens 13.

As shown in FIG. 19, solid immersion lens 13 is arranged to have a shape wherein a central part 13a of the bottom surface thereof protrudes downward with respect to a peripheral part 13b thereof.

Holder 58 is formed to a substantially cylindrical form and is equipped with an annular collar part 58a, which is directed inwards, at the bottom surface thereof. Peripheral part 13b of solid immersion lens 13 is set on annular collar part 58a of holder 58 in the state in which the bottom surface of the protruding central part 13a of solid immersion lens 13 protrudes downward from an opening 58b formed in the inner part of annular collar part 58a, and solid immersion lens 13 is thereby supported in the gravity direction by holder 58.

Here, if the outer diameter of central part 13a of solid immersion lens 13 is E, the outer diameter of peripheral part 13b of solid immersion lens 13 is F, and the inner diameter of opening 58b of holder 58 is G, these are set to satisfy the relationship E<G<F. Solid immersion lens 13 is thus made free with respect to holder 58 and yet the falling-off of solid immersion lens 13 downward from holder 58 is prevented.

Also, by means of a substantially cylindrical cap 59, which is mounted, for example, by fitting, screwing, etc., onto an opening 58c at an upper part of holder 58, the falling-off of solid immersion lens 13 from holder 58 is prevented without obstructing the optical path with respect to semiconductor device S.

Needless to say, even with the present arrangement, the same effects as those of the first embodiment can be obtained. In addition, though processing is required of solid immersion lens 13, in comparison to the first embodiment wherein the self-weights of solid immersion lens 3 and first holder 8 act, since only the weight of solid immersion lens 13 acts on semiconductor device S, the merit that it is even more unlikely for an excessive pressure to be applied to semiconductor device S is provided.

FIG. 20 is a perspective view showing a solid immersion lens holder of a fourth embodiment of this invention, and FIG. 21 is a vertical section showing the solid immersion lens holder in the state in which a lens is set at a closely contacting position. Also, FIG. 22 is a perspective view showing a part at which the solid immersion lens holder and a solid immersion lens moving device are connected. As shown in FIG. 20 and FIG. 21, solid immersion lens holder 105 is equipped with a holder 106 formed to a substantially cylindrical form, which supports solid immersion lens 103, and an arm part 107, which holds this holder 106.

As shown in FIG. 21, holder 106 is equipped with a lower holder 108 and an upper holder 109. Of these, upper holder 109 is arranged as an annular part that is formed integral to arm part 107. Lower holder 108, for supporting solid immersion lens 103, is supported by arm part 107 via this upper holder 109. These holders 108 and 109 are formed to substantially cylindrical forms so as not to obstruct the optical path with respect to semiconductor device S.

As with solid immersion lens 13 shown in FIG. 19, solid immersion lens 103 is arranged to have a shape wherein a central part 103a of the bottom surface thereof protrudes downward with respect to a peripheral part 103b thereof. With the present embodiment, the outer peripheral surface of the protruding central part 103a has a tapered shape that decreases in outer diameter towards the lower side.

Holder 108 is formed to a substantially cylindrical form and is equipped with an annular collar part 108a, which is directed inwards, at the bottom surface thereof. Peripheral part 103b of solid immersion lens 103 is set on annular collar part 108a of holder 108 in the state in which the bottom surface of the protruding central part 103a of solid immersion lens 103 protrudes downward from an opening 108b formed in the inner periphery of annular collar part 108a, and solid immersion lens 103 is thereby supported in the gravity direction by holder 108. The outer and inner diameters of the respective parts are set in the same manner as the embodiment illustrated in FIG. 18 and FIG. 19.

Also, a cap 111 is provided above holders 108 and 109. By this cap 111, the falling-off of solid immersion lens 103 from holders 108 and 109 is prevented without obstruction of the optical path with respect to semiconductor device S. Cap 111 of the present embodiment has an annular form and has an arrangement having a plurality of claw parts (three claw parts in the figure) that protrude towards the inner side.

Also, arm part 107 is formed of a plate-like member that extends outward from upper holder 109, with one end thereof being directed obliquely upward and the other end thereof being integrated with upper holder 109 as mentioned above. As shown in FIG. 20 and FIG. 21, a rotation stopping part 107a, which extends vertically upwards and with which a part of its side face is made a flat surface, is fixed to the one end of arm part 107 as a rotation stop for arm part 107 and holder 106.

As shown in FIG. 22, arm part 107, which makes up solid immersion lens holder 105, is connected to one end of first arm member 71 of solid immersion lens manipulator 30. Furthermore with the present embodiment, first arm part 71 of solid immersion lens manipulator 30 is arranged to be detachably attachable to first arm member rotation source 72. In the arrangement example shown in FIG. 22, first arm member 71 is detachably connected to rotation axis 72a of first arm member rotation source 72 by means of a hexagon socket head bolt 72b.

Needless to say, even with the present arrangement, the same effects as those of the first embodiment can be obtained. In addition, though processing is required of solid immersion lens 103, since only the self-weight of solid immersion lens 103 acts on semiconductor device S, the merit that it is even more unlikely for an excessive pressure to be applied to semiconductor device S is provided.

Also, with the above-described embodiment, first arm member 71, to which solid immersion lens holder 105 is connected, is arranged to be detachably mounted to first arm member rotation source 72. By thus making first arm member rotation source 72, of comparatively high rigidity, an attachable/detachable part, the occurrence of deformation of first arm member 71 or arm part 107 of solid immersion lens holder 105 is prevented and these members are thus improved in durability. Also in performing observation of a sample by means of solid immersion lens 103, the parallelism of the observed object and solid immersion lens 103 can be maintained favorably.

Also with an arrangement wherein first arm member 71 is mounted to first arm member rotation source 72 by means of a bolt, etc., as shown in FIG. 22, the attachment/detachment work can by performed using a hexagonal wrench or other tool. The handling of the device, for example, in exchanging solid immersion lens 103 along with first arm member 71 and solid immersion lens holder 105, etc., is thus facilitated.

Also with the above-described embodiment, a part of holder 106 is arranged from upper holder 109, which is an annular part that is integral to arm part 107. The rigidity of solid immersion lens holder 105 can thereby be improved. Also, the positioning of the arm part and the annular holder part of the solid immersion lens holder (especially the positioning in the rotation direction) is made unnecessary. With such an arrangement, the entirety of holder 106 may be arranged from an annular part that is integral to arm part 107.

Also, arm part 107 is made to have a shape that extends obliquely upward from holder 106. Since space at the side of solid immersion lens 103 can thus be secured, observation of a sample can be carried out favorably. For example, in a case of inspecting a plastic molded type IC, since steps are formed at the surroundings of inspected positions due to mold cutting, the range in which the solid immersion lens holder can be moved is restricted. However, with the above arrangement wherein arm part 107 is made oblique, interference between the steps of the observed object and the arm part of the solid immersion lens holder can be lessened and observation of the observed object using the solid immersion lens can thus be carried out favorably.

With solid immersion lens holder 105 of the above-described arrangement, lower holder 108, having annular collar part 108a, may be made of the same or a similar material as that of upper holder 109 and arm part 107 or may be formed by processing a water absorbing structure, such as a water absorbing ceramic. By applying a water absorbing structure to the holder, the merit that, when an excessive amount of optical contact liquid is applied, the time for drying the liquid and bringing the solid immersion lens and the observed object into close contact optically can be shortened is provided.

FIG. 23 is a perspective view showing another solid immersion lens holder, and FIG. 24 is a vertical section showing this other solid immersion lens holder in the state wherein a lens is positioned at a closely contacting position. With this solid immersion lens holder 64, holder 65, which makes up solid immersion lens holder 64, is formed to have a cylindrical form and the inner diameter thereof is made large in comparison to the outer diameter of solid immersion lens 3. Solid immersion lens 3 is positioned in the inner part of holder 65 with the bottom surface of this solid immersion lens 3 protruding from an opening at the bottom surface of holder 65.

With such a solid immersion lens holder 64, solid immersion lens 3 is moved to a desired observation position by being moved in a sliding manner across semiconductor device S while being hitched onto the inner peripheral surface of holder 65 of solid immersion lens holder 64, which moves within the X-Y plane. Solid immersion lens holder 64 is then moved in the Z-direction and then solid immersion lens holder 64 is furthermore moved within the X-Y plane, thus leaving solid immersion lens 3 on the observation position of semiconductor device S while solid immersion lens holder 64 is moved away from solid immersion lens 3. The merit that observation can be carried out upon moving all components away from the view field of the observation position of semiconductor device S is thereby provided.

Though the present invention has been described specifically based on the embodiments above, this invention is not limited to the above-described embodiments, and various modifications are possible. For example, though with the above-described embodiments, holders 9 and 58 for supporting solid immersion lenses 3 and 13 are formed to have cylindrical forms as especially preferable forms, these holders may instead be flat plates equipped with openings 9b and 58b.

Also with the above-described embodiments, solid immersion lens manipulator 30 is enabled to move solid immersion lens 3 or 13 in the Z-direction to thereby enable solid immersion lens 3 or 13 to be moved freely to desired positions in three-dimensional directions by a simple arrangement. However, z-direction movement source 75 may be eliminated so that the lens manipulator is enabled to move only within the X-Y plane and movement in the Z-direction may be accomplished by means of X-Y-Z stage 15, or stage 18, on which semiconductor device S is set, may be enabled to move in the Z-direction. In such cases, the position at which solid immersion lens 3 or 13 is inserted by solid immersion lens manipulator 30 is deemed to be the closely contacting position. Also, solid immersion lens manipulator 30, which is a three-dimensional direction moving device, is not limited to a rotational type wherein two arm members 71 and 73 are rotated within the X-Y plane but may instead be a known X-Y-Z direction moving device that moves in the orthogonal X-Y-Z directions.

Also, though with the above-described embodiments, a semiconductor device, formed of a semiconductor substrate, is used as an example of the observed object, this invention is not limited thereto, and the observed object may be an electronic device with, for example, a glass or plastic substrate. In this case, glass or plastic is preferably used as the material of the solid immersion lens.

Specifically, though with the above-described embodiments, the observed sample is a semiconductor device, generally when semiconductor devices and various other types of electronic devices are used as samples, the device to be observed is not limited to that which uses a semiconductor substrate, and the observed object may be an integrated circuit, such as a polysilicon thin film transistor that has glass or plastic, etc., as the substrate. For example, with a liquid crystal device, the device is prepared on a glass substrate, and with an organic EL, the device is prepared on a plastic substrate. As even more general samples, biological samples using prepared slides, etc., can be cited in addition to the abovementioned semiconductor devices, liquid crystal devices, and various other types of devices.

Also, though with each of the above-described embodiments, application to inspection device 1 for semiconductor device S is described as an especially effective application, this invention is not limited thereto and may be applied, for example, to an optical observation device, etc., for performing inspection of an optical recording medium as an observed object, as described in Japanese Patent Application Laid-Open No. H11-305135.

Also, though with each of the above-described embodiments, a predetermined position of the lower surface of the observed object (surface of semiconductor device S) is observed and solid immersion lens 3 or 13 is used so that the focal point is set at a predetermined position of the lower surface of the observed object, this invention is not limited thereto, and in cases where the interior or upper surface of an observed object is to be observed, a solid immersion lens may be used to set the focal point in the interior or at the upper surface of the observed object as described, for example, in Japanese Patent Application Laid-Open No. 2001-189359.

With each of the above-described solid immersion lens holders, since excessive pressure will not be applied to the observed object, the damaging of the observed object can be prevented. Also, since the solid immersion lens is put in close contact in conformance (compliance) with the observed object and yet temperature drifts at the holder side or the observed object side are cut off from the counterpart side and thus the influences of such temperature drifts are eliminated, high-precision observation is enabled.

What is claimed is:
1. A solid immersion lens holder comprising:
a holder, supporting a solid immersion lens in the gravity direction with a bottom surface of the solid immersion lens protruding downward through an opening, said solid immersion lens being configured to move independently with respect to said holder, wherein said holder comprises:
a first holder, formed to have a cylindrical shape, holding said solid immersion lens in a state wherein the bottom surface of said solid immersion lens is protruded down- ward through an opening at the bottom surface thereof, and being equipped with a collar part at an outer peripheral surface thereof; and a second holder, formed to have a cylindrical shape, having said collar part of said first holder set thereon in a state wherein the bottom surface of the solid immersion lens, held by said first holder, is protruded downward through an opening at the bottom surface thereof, and supporting said first holder and said solid immersion lens in the gravity direction.

2. The solid immersion lens holder according to claim 1, wherein the holder that supports said solid immersion lens is equipped with a cylindrical cap that is fitted onto an opening at an upper part of the holder and is for preventing the falling-off of said solid immersion lens.

3. A solid immersion lens holder comprising:

a holder, supporting a solid immersion lens in the gravity direction with a bottom surface of the solid immersion lens protruding downward through an opening, said solid immersion lens being configured to move independently in the gravity direction with respect to said holder, wherein said solid immersion lens is arranged so that a central part of a bottom surface thereof protrudes with respect to a peripheral edge part thereof, said holder is formed to be cylindrical, has the peripheral edge part of said solid immersion lens set thereon in a state wherein the central part of said solid immersion lens is protruded downward through an opening at the bottom surface thereof, and supports said solid immersion lens in the gravity direction, and wherein the holder that supports said solid immersion lens is equipped with a cylindrical cap that is fitted onto an opening at an upper part of the holder and is for preventing the falling-off of said solid immersion lens.

4. The solid immersion lens holder according to claim 3, further comprising an arm part, extending outward from the holder that supports said solid immersion lens, said arm part being connected to a three-dimensional direction moving device.

5. The solid immersion lens holder according to claim 4, wherein said arm part is detachably connected to said three-dimensional direction moving device.

6. A microscope comprising:
a solid immersion lens for observing a sample; and
the solid immersion lens holder according to claim 3, for supporting said solid immersion lens.

7. The microscope according to claim 6, wherein said solid immersion lens is arranged so that an outer peripheral surface of the protruding central part has a tapered shape.

8. A solid immersion lens holder comprising:

a holder, supporting a solid immersion lens in the gravity direction with a bottom surface of the solid immersion lens protruding downward through an opening, said solid immersion lens being configured to move independently in the gravity direction with respect to said holder, wherein said solid immersion lens is arranged so that a central part of a bottom surface thereof protrudes with respect to a peripheral edge part thereof, said holder is formed to be cylindrical, has the peripheral edge part of said solid immersion lens set thereon in a state wherein the central part of said solid immersion lens is protruded downward through an opening at the bottom surface thereof, and supports said solid immersion lens in the gravity direction, and wherein the holder that supports said solid immersion lens is equipped with a cap that has an annular form and has an arrangement having a plurality of claw parts that protrude towards the inner side.

9. The solid immersion lens holder according to claim 8, further comprising an arm part, extending outward from the holder that supports said solid immersion lens, said arm part being connected to a three-dimensional direction moving device.

10. The solid immersion lens holder according to claim 9, wherein said arm part is detachably connected to said three-dimensional direction moving device.

11. A microscope comprising:
a solid immersion lens for observing a sample; and
the solid immersion lens holder according to claim 8, for supporting said solid immersion lens.

12. The microscope according to claim 11, wherein said solid immersion lens is arranged so that an outer peripheral surface of the protruding central part has a tapered shape.

* * * * *